United States Patent
Zhamu et al.

(10) Patent No.: US 8,906,447 B2
(45) Date of Patent: Dec. 9, 2014

(54) METHOD OF PRODUCING HYBRID NANO-FILAMENT ELECTRODES FOR LITHIUM METAL OR LITHIUM ION BATTERIES

(75) Inventors: Aruna Zhamu, Centerville, OH (US); Bor Z. Jang, Centerville, OH (US)

(73) Assignee: Nanotek Instruments, Inc., Dayton, OH (US)

(*) Notice: Subject to any disclaimer, the term of this patent is extended or adjusted under 35 U.S.C. 154(b) by 797 days.

(21) Appl. No.: 12/077,520

(22) Filed: Mar. 20, 2008

(65) Prior Publication Data
US 2009/0169725 A1    Jul. 2, 2009

(51) Int. Cl.
*B05D 5/12* (2006.01)
*H01M 4/139* (2010.01)
(Continued)

(52) U.S. Cl.
CPC .............. *H01M 4/139* (2013.01); *D01F 9/21* (2013.01); *D04H 3/02* (2013.01); *D04H 3/16* (2013.01); *D06M 10/06* (2013.01); *D06M 11/46* (2013.01); *D06M 11/47* (2013.01); *D06M 11/485* (2013.01); *D06M 11/49* (2013.01); *D06M 11/71* (2013.01); *D06M 11/78* (2013.01); *D06M 11/83* (2013.01); *H01M 4/0416* (2013.01); *H01M 4/0428* (2013.01); *H01M 4/0438* (2013.01); *H01M 4/0452* (2013.01); *H01M 4/0471* (2013.01); *H01M 4/049* (2013.01); *H01M 4/74* (2013.01); *D06M 2101/40* (2013.01); *H01M 4/1391* (2013.01); *H01M 4/1395* (2013.01); *Y02E 60/122* (2013.01); *D01D 5/0007* (2013.01)
USPC ........................ 427/115; 427/122; 427/212

(58) Field of Classification Search
USPC ......................................... 427/115, 123, 212
See application file for complete search history.

(56) References Cited

U.S. PATENT DOCUMENTS

| 4,019,887 A | 4/1977 | Kirkbride et al. |
| 4,112,135 A | 9/1978 | Heaps et al. |

(Continued)

OTHER PUBLICATIONS

Kim et al. Characteristics of supercapacitor electrodes of PBI-based carbon nanofiber web prepared by electrospinning, Electrochimica Acta 50 (2004) 877-881.*

(Continued)

*Primary Examiner* — Brian K Talbot

(57) ABSTRACT

Disclosed is a method of producing a hybrid nano-filament composition for use in a lithium battery electrode. The method comprises: (a) providing an aggregate of nanometer-scaled, electrically conductive filaments that are substantially interconnected, intersected, physically contacted, or chemically bonded to form a porous network of electrically conductive filaments, wherein the filaments comprise electro-spun nano-fibers that have a diameter less than 500 nm (preferably less than 100 nm); and (b) depositing micron- or nanometer-scaled coating onto a surface of the electro-spun nano-fibers, wherein the coating comprises an electro-active material capable of absorbing and desorbing lithium ions and the coating has a thickness less than 10 μm (preferably less than 1 μm). The same method can be followed to produce an anode or a cathode. The battery featuring an anode or cathode made with this method exhibits an exceptionally high specific capacity, an excellent reversible capacity, and a long cycle life.

20 Claims, 13 Drawing Sheets

(51) Int. Cl.

| | | |
|---|---|---|
| *D01F 9/21* | (2006.01) | |
| *D04H 3/02* | (2006.01) | |
| *D04H 3/16* | (2006.01) | |
| *D06M 10/06* | (2006.01) | |
| *D06M 11/46* | (2006.01) | |
| *D06M 11/47* | (2006.01) | |
| *D06M 11/48* | (2006.01) | |
| *D06M 11/49* | (2006.01) | |
| *D06M 11/71* | (2006.01) | |
| *D06M 11/78* | (2006.01) | |
| *D06M 11/83* | (2006.01) | |
| *H01M 4/04* | (2006.01) | |
| *H01M 4/74* | (2006.01) | |
| *D06M 101/40* | (2006.01) | |
| *H01M 4/1391* | (2010.01) | |
| *H01M 4/1395* | (2010.01) | |
| *D01D 5/00* | (2006.01) | |

(56) References Cited

U.S. PATENT DOCUMENTS

| | | | |
|---|---|---|---|
| 5,635,151 A | 6/1997 | Zhang et al. | |
| 5,908,715 A | 6/1999 | Liu et al. | |
| 6,007,945 A | 12/1999 | Jacobs et al. | |
| 6,143,448 A | 11/2000 | Fauteux et al. | |
| 6,316,143 B1 | 11/2001 | Foster et al. | |
| 6,398,125 B1 | 6/2002 | Liu et al. | |
| 6,503,570 B2 | 1/2003 | Matsuki et al. | |
| 6,518,087 B1 | 2/2003 | Furusawa et al. | |
| 6,524,744 B1 | 2/2003 | Clerc et al. | |
| 6,623,559 B2 | 9/2003 | Huang | |
| 6,872,330 B2 | 3/2005 | Mack et al. | |
| 7,094,499 B1 | 8/2006 | Hung | |
| 7,709,139 B2 * | 5/2010 | White et al. | 429/127 |
| 2002/0079623 A1 * | 6/2002 | Petrak | 264/624 |
| 2005/0053840 A1 * | 3/2005 | Jo et al. | 429/247 |
| 2005/0058896 A1 * | 3/2005 | Nomura et al. | 429/142 |
| 2006/0040182 A1 * | 2/2006 | Kawakami et al. | 429/218.1 |
| 2006/0049101 A1 | 3/2006 | Suib et al. | |
| 2006/0216603 A1 | 9/2006 | Choi | |
| 2006/0237697 A1 | 10/2006 | Kosuzu et al. | |
| 2006/0263689 A1 | 11/2006 | Ishihara et al. | |
| 2007/0020519 A1 | 1/2007 | Kim et al. | |
| 2007/0031730 A1 | 2/2007 | Kawakami et al. | |
| 2007/0122701 A1 | 5/2007 | Yamaguchi | |
| 2007/0148544 A1 | 6/2007 | Le | |
| 2008/0261116 A1 * | 10/2008 | Burton et al. | 429/231.8 |
| 2009/0068553 A1 * | 3/2009 | Firsich | 429/122 |

OTHER PUBLICATIONS

U.S. Appl. No. 11/509,424, filed Aug. 25, 2006, B. Z. Jang, et al.

C. K. Chan, et al., "High-Performance Lithium Battery Anodes Using Silicon Nanowires," Nature Nanotechnology, published online Dec. 16, 2007, 5 pages.

J. M. Deitzel, et al., "The Effect of Processing Variables on the Morphology of Electro-spun Nano-fibers and Textiles," Polymer, 42 (2001) pp. 261-272.

A. F. Spivak, Y.A. Dzenis and D.H. Reneker, "A Model of Steady State Jet in the Electro-spinning Process," Mech. Res. Commun. 27 (2000) pp. 37-42.

I. D. Norris, et al., "Electrostatic Fabrication of Ultrafine Conducting Fibers: Polyaniline/Polyethylene oxide Blends," Synthetic Metals, 114 (2000) 109-114.

W. C. West, et al., "Electrodeposited Amorphous Manganese Oxide Nanowire Arrays for High Energy and Power Density Electrodes," J. Power Source, 126 (2004) 203-206.

S. Ohara, et al., "Li Insertion/Extraction Reaction at a Si Film Evaporated on a Ni Foil," J. Power Source, 119-121 (2003) 591-596.

T. Takamura, et al., "A Vacuum Deposited Si Film Having a Li Extraction Capacity Over 2000 mAh/g with a Long Cycle Life," J. Power Source, 129 (2004) 96-100.

M. Uehara, et al., "Thick Vacuum Deposited Silicon Films Suitable for the Anode of Li-ion Battery," J. Power Source, 146 (2005) 441-444.

S. Ohara, et al., "A Thin Film Silicon Anode for Li-ion Batteries Having a very Large Specific Capacity and a Long Cycle Life," J. Power Source, 136 (2004) 303-306.

J. Niu, et, "Improvement of Usable Capacity and Cyclability of Silicon-Based Anode Materials," Electrochemical and Solid-State Letters, 5(6) (2002) A107-A110.

T. L. Kulova, et al., "Lithium Insertion into Amorphous Silicon Thin-Film Electrodes," J. Electroanalytical Chemistry, 600 (2007) 217-225.

S. Bourderau, et al., "Amorphous Silicon as a Possible Anode Material for Li-ion Batteries," J. Power Source, 81-82 (1999) 233-236.

K. L. Lee, et al., "Electrochemical Characteristics of a-Si Thin Film Anode for Li-ion Rechargeable Batteries," J. Power Source, 129 (2004) 270-274.

H. J. Jung, et al., "Amorphous Silicon Anode for Lithium-Ion Rechargeable Batteries," J. Power Source, 115 (2003) 346-351.

C. J. Kim, et al., "Critical Size of a Nano SnO2 Electrode for Li-Secondary Battery," Chem., Mater., 17 (2005) 3297-3301.

J. Read, et al., "SnO2-Carbon Composites for Lithium-Ion Battery Anode," J. Power Source, 96 (2001) 277-281.

L. Yuan, et al., "Nano-structured SnO2-Carbon Composites Obtained by in-situ Spray Pyrolysis Method as Anodes in Lithium Batteries," J. Power Source, 146 (2005) 180-184.

\* cited by examiner

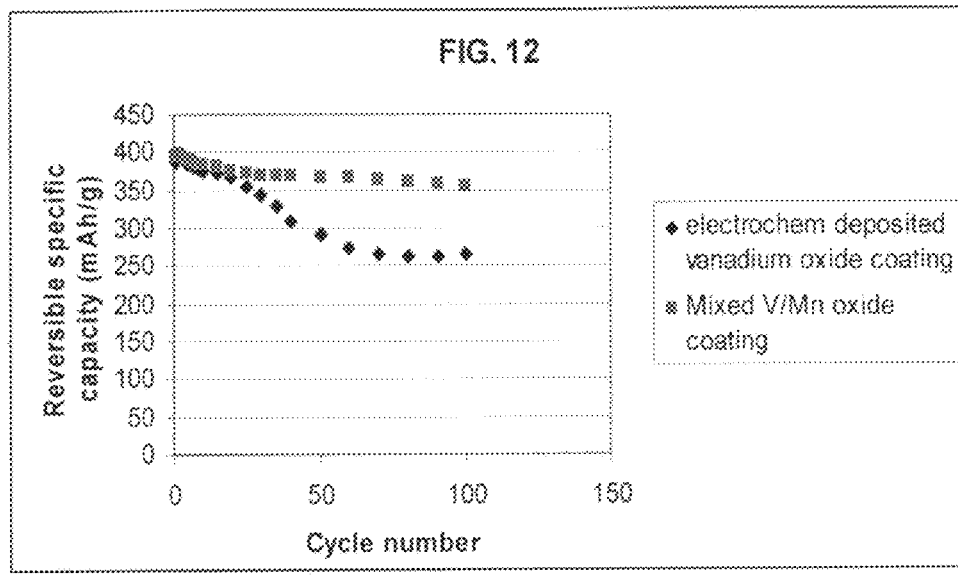

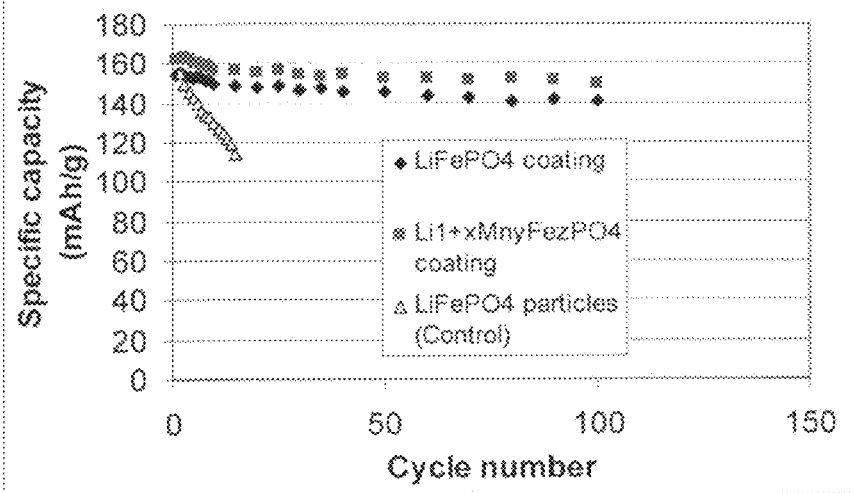

METHOD OF PRODUCING HYBRID NANO-FILAMENT ELECTRODES FOR LITHIUM METAL OR LITHIUM ION BATTERIES

FIELD OF THE INVENTION

The present invention provides a method of producing a hybrid, nano-scaled filamentary material composition for use as an anode or a cathode material in a lithium-ion battery, or as a cathode material in a lithium metal battery.

BACKGROUND

The following list of references is closely related to the prior art of lithium ion battery electrodes:

REFERENCES

1. Zhang, et al., "Carbon Electrode Materials for Lithium Battery Cells and Method of Making Same," U.S. Pat. No. 5,635,151 (Jun. 3, 1997).
2. Liu, et al., "Composite Carbon Materials for Lithium Ion Batteries, and Method of Producing Same," U.S. Pat. No. 5,908,715 (Jun. 1, 1999).
3. Jacobs, et al, U.S. Pat. No. 6,007,945 (Dec. 28, 1999).
4. Fauteux, et al., U.S. Pat. No. 6,143,448 (Nov. 7, 2000).
5. C. C. Hung, "Carbon Materials Metal/Metal Oxide Nanoparticle Composite and Battery Anode Composed of the Same, U.S. Pat. No. 7,094,499 (Aug. 22, 2006).
6. D. Clerc, et al., "Multiphase Material and Electrodes Made Therefrom," U.S. Pat. No. 6,524,744 (Feb. 25, 2003).
7. D. L. Foster, et al, "Electrode for Rechargeable Lithium-Ion Battery and Method for Fabrication," U.S. Pat. No. 6,316,143 (Nov. 13, 2001).
8. D. B. Le, "Silicon-Containing Alloys Useful as Electrodes for Lithium-Ion Batteries," US 2007/0148544 (Pub. Jun. 28, 2007).
9. H. Yamaguchi, "Anode Material, Anode and Battery," US 2007/0122701 (Pub. May 31, 2007).
10. S. Kawakami, et al., "Electrode Material for Anode of Rechargeable Lithium Battery," US 2007/0031730 (Pub. Feb. 8, 2007).
11. H. Kim, et al., "Anode Active Material, Manufacturing Method Thereof, and Lithium Battery Using the Anode Active Material," US 2007/0020519 (Pub. Jan. 25, 2007).
12. H. Ishihara, "Anode Active Material and Battery," US 2006/0263689 (Pub. Nov. 23, 2006).
13. T. Kosuzu, et al., "Electrode Material for Rechargeable Lithium Battery," US 2006/0237697 (Pub. Oct. 26, 2006).
14. C. K. Chan, et al., "High-Performance Lithium Battery Anodes Using Silicon Nanowires," Nature Nanotechnology, published online 16 Dec. 2007, 5 pages.
15. J. J. Mack, et al., "Chemical Manufacture of Nanostructured Materials," U.S. Pat. No. 6,872,330 (Mar. 29, 2005).
16. Bor Z. Jang, Aruna Zhamu, and Jiusheng Guo, "Process for Producing Nano-scaled Platelets and Nanocomposites," U.S. patent application Ser. No. 11/509,424 (Aug. 25, 2006).
17. J. M. Deitzel, J. Kleinmeyer, D. Harris and N. C. Beck Tan, "The Effect of Processing Variables on the Morphology of Electro-spun Nano-fibers and Textiles," Polymer, 42 (2001) pp. 261-272.
18. A. F. Spivak, Y. A. Dzenis and D. H. Reneker, "A Model of Steady State Jet in the Electro-spinning Process," Mech. Res. Commun. 27 (2000) pp. 37-42.
19. I. D. Norris, et al., "Electrostatic Fabrication of Ultrafine Conducting Fibers: Polyaniline/Polyethylene oxide Blends," Synthetic Metals, 114 (2000) 109-114.
20. W. C. West, et al., "Electrodeposited Amorphous Manganese Oxide Nanowire Arrays for High Energy and Power Density Electrodes," J. Power Source, 126 (2004) 203-206.
21. S. L. Suib, et al., "Manganese Nanowires, Films, and Membranes and Methods of Making," US 2006/0049101 (Mar. 9, 2006).
22. S. H. Choi, "Lithium-Ion Rechargeable Battery Based on Nanostructures," US 2006/0216603 (Sep. 28, 2006).
23. W. C. Huang, "Method for the Production of Semiconductor Quantum Particles," U.S. Pat. No. 6,623,559 (Sep. 23, 2003).
24. J. H. Liu and B. Z. Jang, "Process and Apparatus for the Production of Nano-Scaled Powders," U.S. Pat. No. 6,398,125 (Jun. 4, 2002).
25. S. Ohara, et al., "Li Insertion/Extraction Reaction at a Si Film Evaporated on a Ni Foil," J. Power Source, 119-121 (2003) 591-596.
26. T. Takamura, et al., "A Vacuum Deposited Si Film Having a Li Extraction Capacity Over 2000 mAh/g with a Long Cycle Life," J. Power Source, 129 (2004) 96-100.
27. M. Uehara, et al., "Thick Vacuum Deposited Silicon Films Suitable for the Anode of Li-ion Battery," J. Power Source, 146 (2005) 441-444.
28. S. Ohara, et al., "A Thin Film Silicon Anode for Li-ion Batteries Having a very Large Specific Capacity and a Long Cycle Life," J. Power Source, 136 (2004) 303-306.
29. J. Niu and J. Y. Lee, "Improvement of Usable Capacity and Cyclability of Silicon-Based Anode Materials for Lithium Batteries by Sol-Gel Graphite Matrix," Electrochemical and Solid-State Letters, 5(6) (2002) A107-A110.
30. T. L. Kulova, et al., "Lithium Insertion into Amorphous Silicon Thin-Film Electrodes," J. Electroanalytical Chemistry, 600 (2007) 217-225.
31. S. Bourderau, et al., "Amorphous Silicon as a Possible Anode Material for Li-ion Batteries," J. Power Source, 81-82 (1999) 233-236.
32. K. L. Lee, et al., "Electrochemical Characteristics of a-Si Thin Film Anode for Li-ion Rechargeable Batteries," J. Power Source, 129 (2004) 270-274.
33. H. J. Jung, et al., "Amorphous Silicon Anode for Lithium-Ion Rechargeable Batteries," J. Power Source, 115 (2003) 346-351.
34. C. J. Kim, et al., "Critical Size of a Nano $SnO_2$ Electrode for Li-Secondary Battery," Chem., Mater., 17 (2005) 3297-3301.
35. J. Read, et al., "$SnO_2$-Carbon Composites for Lithium-Ion Battery Anode," J. Power Source, 96 (2001) 277-281.
36. L. Yuan, et al., "Nano-structured $SnO_2$-Carbon Composites Obtained by in-situ Spray Pyrolysis Method as Anodes in Lithium Batteries," J. Power Source, 146 (2005) 180-184.
37. B. J. Kirkbride, et al., "Method for Coating Glass," U.S. Pat. No. 4,019,887, Jun. 10, 1975.
38. J. D. Heaps, et al., "Method for dip-coating ceramic with molten silicon," U.S. Pat. No. 4,112,135 (Sep. 5, 1978).

Concerns over the safety of earlier lithium secondary batteries led to the development of lithium ion secondary batteries, in which pure lithium metal sheet or film was replaced by carbonaceous materials as the anode. The carbonaceous material may comprise primarily graphite that can be intercalated with lithium and the resulting graphite intercalation compound may be expressed as $Li_xC_6$, where x is typically less than 1. In order to minimize the loss in energy density due to this replacement, x in $Li_xC_6$ must be maximized and the irreversible capacity loss $Q_{ir}$ in the first charge of the battery must be minimized. The maximum amount of lithium that can be reversibly intercalated into the interstices between graphene planes of a perfect graphite crystal is generally believed to occur in a graphite intercalation compound represented by $Li_xC_6$ (x=1), corresponding to a theoretical specific capacity of 372 mAh/g [Ref. 1].

In addition to carbon- or graphite-based anode materials, other inorganic materials that have been evaluated for potential anode applications include metal oxides, metal nitrides, metal sulfides, and a range of metals, metal alloys, and intermetallic compounds that can accommodate lithium atoms/ions. In particular, lithium alloys having a composition formula of $Li_aA$ (A is a metal such as Al, and "a" satisfies 0<a<5) has been investigated as potential anode materials. This class of anode material has a higher theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, for the anodes composed of these materials, pulverization (fragmentation of the alloy particles or fracturing of current collector-supported thin films) proceeds with the progress of the charging and discharging cycles due to expansion and contraction of the anode during the insertion and extraction of lithium ions. The expansion and contraction result in reduction in or loss of particle-to-particle contacts or contacts between the anode material and its current collector. These adverse effects result in a significantly shortened charge-discharge cycle life.

To overcome the problems associated with such mechanical degradation, several approaches have been proposed, including (a) using nano-scaled particles of an anode active material, (b) composites composed of small electrochemically active particles supported by less active or non-active matrices or coatings, and (c) metal alloying [e.g., Refs. 2-13]. Examples of active particles are Si, Sn, and $SnO_2$. However, most of prior art composite electrodes have deficiencies in some ways, e.g., in most cases, less than satisfactory reversible capacity, poor cycling stability, high irreversible capacity, ineffectiveness in reducing the internal stress or strain during the lithium ion insertion and extraction cycles, and some undesirable side effects.

It may be further noted that the cathode materials used in the prior art Li ion batteries are not without issues. As a matter of fact, a practical specific capacity of a cathode material has been, at the most, up to 200 mAh/g, based on per unit weight of the cathode material. The positive electrode (cathode) active material is typically selected from a broad array of lithium-containing or lithium-accommodating oxides, such as manganese dioxide, manganese composite oxide, nickel oxide, cobalt oxide, nickel cobalt oxide, iron oxide, vanadium oxide, and iron phosphate. The cathode active material may also be selected from chalcogen compounds, such as titanium disulfate or molybdenum disulfate. These prior art materials do not offer a high lithium insertion capacity and this capacity also tends to decay rapidly upon repeated charging and discharging. In many cases, this capacity fading may be ascribed to particle or thin film pulverization (analogous to the case of an anode material), resulting in a loss of electrical contact of the cathode active material particles with the cathode current collector.

Furthermore, in most of the prior art electrodes (anodes or cathodes), a significant amount of a conductive material, such as acetylene black (AB), carbon black (CB), or ultra-fine graphite particles, must be used to improve the electrical connection between the electrode active material (typically in a fine powder form) and a current collector (e.g., Al or Cu foil). Additionally, a binder is normally required to bond the constituent particles of both the electrode active material and the conductive additive for forming an integral electrode body. The binder is typically selected from polytetrafluoroethylene (PTFE), polyvinylidene fluoride (PVDF), ethylene-propylene-diene copolymer (EPDM), or styrene-butadiene rubber (SBR), for example. A typical mixing ratio of these ingredients is 60% to 85% by weight for the electrode active material, 5% to 30% by weight for the conductive additive, and approximately 5% to 10% by weight for the binder. This implies that the cathode typically contains a significant proportion of non-electro-active materials (up to 40%) that do not contribute to the absorption and extraction of Li ions, leading to a low specific capacity.

Therefore, a need exists for an electrode active material that has a high specific capacity, a minimal irreversible capacity (low decay rate), and a long cycle life.

SUMMARY OF THE INVENTION

The present invention provides a method of producing a hybrid nano-filament composition for use in a lithium battery electrode. The method comprises: (a) providing an aggregate of nanometer-scaled, electrically conductive filaments that are substantially interconnected, intersected, physically contacted, or chemically bonded to form a porous network of electrically conductive filaments, wherein the filaments comprise electro-spun nano-fibers that have a diameter less than 500 nm (preferably less than 100 nm); and (b) depositing micron- or nanometer-scaled coating onto a surface of the electro-spun nano-fibers, wherein the coating comprises an electro-active material capable of absorbing and desorbing lithium ions and the coating has a thickness less than 10 μm (preferably less than 1 μm). The same method can be followed to produce either an anode or a cathode.

Preferably, multiple conductive filaments (comprising electro-spun nano-fibers) are processed to form an aggregate or web, characterized in that these filaments are intersected, overlapped, or somehow bonded to one another to form a network of electron-conducting paths, which are electrically connected to a current collector. Preferably, this conductive network of filaments is formed before a thin coating of an electro-active material is applied onto the exterior surface of the filaments. However, it is possible that the formation of a network of conductive filaments and the coating step occur concurrently.

The electro-active material may be an anode active material, such as silicon and tin, or a cathode active material, such as lithium manganese oxide, lithium cobalt oxide, lithium nickel oxide, lithium vanadium oxide, and lithium transition metal phosphate (e.g., lithium iron phosphate). The aggregate or web has substantially interconnected pores that are intended for accommodating the electrolyte in a battery.

The thin coating, with a thickness less than 10 μm (preferably less than 1 μm), is deposited on a surface of electro-spun nano-fibers, preferably covering a majority of the exterior surface of the substrate fibers. The substrate fibers may be selected from a range of electro-spun nano-fibers.

As a preferred embodiment of the present invention, the step of providing an aggregate of nanometer-scaled, electrically conductive filaments may comprise: (a) electro-spinning of nano-fibers from a conductive polymer; (b) electro-spinning of nano-fibers from a polymer containing a conductive nano filler; (c) electro-spinning of nano-fibers from a polymer, applying an electrically conductive coating material onto a surface of the nano-fibers; (d) electro-spinning of nano-fibers from a polymer, heat-treating the polymer nano-fibers to obtain carbonized nano-fibers; or (e) electro-spinning of nano-fibers from a polymer, heat-treating the polymer nano-fibers to obtain carbonized nano-fibers and graphitizing the carbonized nano-fibers at a temperature higher than 1,500° C. to obtain graphite nano-fibers. Graphitization of a carbonized fiber or polymeric carbon fiber is typically carried out at a temperature in the range of 2,500-3,000° C. in an inert or nitrogen atmosphere.

In the aforementioned step (c), the conductive coating material may be selected from a conductive polymer (e.g., intrinsically conductive polymer such as polyaniline), a conductive organic material, a metal or metal alloy, amorphous carbon (e.g., from chemical vapor deposition), polymeric carbon (e.g., from pyrolyzation of a polymer coating), or a combination thereof. In step (d) or step (e), heat-treating of polymer nano-fibers may be conducted at a temperature in the range of 200° C. and 1,500° C. For instance, polyacrylonitrile (PAN) nano-fibers may be "oxidized" or "cross-linked" at 150° C.-300° C., followed by carbonization at 300° C.-1,500° C.

The electro-spinning process may be carried out continuously or intermittently, preferably on a reel-to-reel (roll-to-roll) basis. The electro-spun nano-fibers preferably have a diameter smaller than 500 nm (more preferably smaller than 100 nm).

The approach of depositing micron- or nanometer-scaled coating onto a surface of the electro-spun nano-fibers may be selected from metal melt dip coating, solution dip coating, chemical vapor deposition, physical vapor deposition, plasma-enhanced chemical vapor deposition, plasma-enhanced physical vapor deposition, plasma arc deposition, hot-wire chemical vapor deposition, sputtering, reactive sputtering, laser-assisted deposition, ion-assisted deposition, electrochemical deposition, sol-gel process, electrophoretic deposition (EPD), spin coating, or a combination thereof.

A particularly preferred method of depositing an anode active coating onto a surface of electro-spun nano-fibers comprises simply dipping nano-fibers in molten silicon or tin, for instance. Alternatively, the step of depositing coating onto a surface of the electro-spun nano-fibers includes coating a precursor onto a surface of the nano-fibers and chemically or thermally converting the precursor into an electro-active material. For instance, the precursor may comprise silane, cyclohexasilane, polysilane, polysiloxane, a silicon-containing organic, a silicon-containing polymer, a pitch-silane blend, or a combination thereof. Here, the pitch may be a petroleum or coal tar pitch. The precursor such as cyclohexasilane can be easily converted into silicon coating using infrared, ultraviolet, and/or heat. If the electro-spun nano-fibers comprise a polymer therein or thereon, the polymer and the precursor may be pyrolyzed or heat-treated substantially at the same time.

The cathode active material coating may be selected from, as examples, lithium manganese oxide, cobalt oxide, nickel oxide, vanadium oxide, or a mixture thereof. These oxides may be doped with one or more elements selected from Li, Na, K, Al, Mg, Cr, Ni, Mn, Cu, Sn, Zn, other transition metals, or rare earth metals. Dopants are used primarily to stabilize the phase or crystal structure during repeated cycles of charging and discharging. Other cathode active materials that can be made into a thin coating or film on a surface of a conductive filament may also be used for practicing the present invention. These include lithium iron phosphate, lithium manganese-iron phosphate, other lithium-containing transition metal phosphates, transition metal sulfides, etc.

The anode active material may comprise a lithium metal or lithium alloy (e.g., in a thin foil form) if the battery is a lithium metal battery. For a lithium ion battery, the anode active material may be selected from the following groups of materials:

(a) Silicon (Si), germanium (Ge), tin (Sn), lead (Pb), antimony (Sb), bismuth (Bi), zinc (Zn), aluminum (Al), and cadmium (Cd); preferably of nanocrystalline or amorphous structure in a thin film (coating) form. The coating is preferably thinner than 20 µm, more preferably thinner than 1 µm, and most preferably thinner than 100 nm;

(b) The alloys or intermetallic compounds of Si, Ge, Sn, Pb, Sb, Bi, Zn, Al, or Cd, stoichiometric or non-stoichiometric with other elements; and (c) The oxides, carbides, nitrides, sulfides, phosphides, selenides, tellurides, antimonides, or their mixtures (e.g., co-oxides or composite oxides) of Si, Ge, Sn, Pb, Sb, Bi, Zn, Al, Fe, or Cd.

The aforementioned electrode active materials, either cathode or anode active materials, when used alone as an electrode active material in a particulate form (particles bonded by a resin binder and mixed with a conductive additives such as carbon black) or thin film form (directly coated on a copper- or aluminum-based current collector), have been commonly found to suffer from the fragmentation (pulverization) problem and poor cycling stability. By contrast, when coated on the exterior surface of multiple conductive filaments (electro-spun nano-fibers) to form a hybrid, nano filament web, the resulting electrode surprisingly exhibits a high reversible capacity, a low irreversible capacity loss, long cycle life, low internal resistance, and fast charge-recharge rates.

The presently invented electro-active material fabrication technology has several major advantages, summarized as follows:

(1) During lithium insertion and extraction, the coating layer expands and shrinks. The geometry of the underlying filament (e.g., thin diameter of electro-spun nano-fibers) enables the supported coating to freely undergo strain relaxation in transverse directions (e.g., in a radial direction). Surprisingly, the filaments selected in the present invention are chemically and thermo-mechanically compatible with the electro-active material coating, to the extent that the coating does not loss contact with its underlying substrate filament upon repeated charge/discharge cycling. Further, it seems that the aggregate or web of filaments, being mechanically strong and tough, are capable of accommodating or cushioning the strains or stresses imposed on the filaments without fracturing. This feature serves to maintain a network of electron-conducting paths that are electronically connected to a current collector.

(2) With the active material coating thickness less than 1 µm (most preferably less than 100 nm), the distance that lithium ions have to travel is short. The electrode can quickly store or release lithium and, hence, the battery can be discharged or re-charged rapidly. This is a highly beneficial feature for a battery that is intended for electric vehicle applications, where a fast discharge rate capability (e.g., during acceleration) is required. In all battery applications, a fast re-charge rate is clearly a highly desirable feature.

(3) The presently invented hybrid nano filament-based electrode platform technology is applicable to both the anode and cathode configuration and can be used to prepare electrodes from a broad array of anode and cathode active materials.

(4) The interconnected network of filaments (schematically shown in FIG. 1(B)) forms a continuous path for electrons, resulting in significantly reduced internal energy loss or internal heating. The electrons that are produced at the anode or those that reach the cathode active material coated on the exterior surface of a filament (with a radius r) only have to travel along a radial direction to a short distance t (which is the thickness of the coating, typically<1 μm) through a large cross-sectional area A, which is equivalent to the total exterior surface of a filament (A=2π[r+t]L). Here, L is the length of the coating in the filament longitudinal axis direction. This implies a low resistance according to the well-known relation between the resistance $R_1$ of a physical object and the intrinsic resistivity ρ of the material making up the object: $R_1=\rho(t/A)=\rho t/(2\pi[r+t]L)=(3\ \Omega cm \times 100\ nm)/(6.28 \times 150\ nm \times 10 \times 10^4\ cm)=3.2 \times 10^2\ \Omega$. In this calculation we have assumed r=50 nm, t=100 nm, and L=10 μm. Once the electrons move from the outer coating into the underlying filament, which is highly conductive, they will rapidly travel down the filament longitudinal axis (of length L') and be collected by a current collector, which is made to be in good electronic contact with the web or individual filaments ($\rho_f=10^4\ \Omega cm$, a typical value for graphitized, electro-spun nano-fibers). The resistance along this highly conductive filament (average travel distance=½L') is very low, $R_2=\frac{1}{2}\rho'(L'/A'')=\frac{1}{2}10^{-4}\ \Omega cm \times 10 \times 10^4\ cm/[0.785 \times 10^{-10}\ cm^2] = 6.37 \times 10^2\ \Omega$. The total resistance=$R_1+R_2=9.57 \times 10^2\ \Omega$.

This is in sharp contrast to the situation as proposed by West, et al. [20], Suib, et al. [21], and Choi, et al. [22], where the cathode active material was in the form of parallel nanowires that were end-connected to a cathode current collector plate, as schematically shown in FIG. 1(A). Chan, et al [Ref. 14] proposed a similar approach for an anode active material, where multiple Si nanowires were catalytically grown from an anode current collector surface in a substantially perpendicular direction. The later case [Ref. 14] is herein used as an example to illustrate the drawbacks of nanowire-based electrode as proposed in [Refs. 14, 20-22]. The electrons produced by the Si nanowires (diameter=89 nm) in an anode must travel through a narrow cross-sectional area A' of a nanowire of length l. The resistance to electron transport along the nanowire is given approximately by $R=\rho(\frac{1}{2}l/A')$, with an average travel distance of half of the nanowire length (hence the factor, ½). Based on the data provided by Chan, et al., ρ=3 Ωcm (after first cycle), $A'=(\pi d^2/4)=19.8 \times 10^{-12}\ cm^2$, and l=10 μm, we have $R=\frac{1}{2} \times 3\ \Omega cm \times 10 \times 10^{-4}\ cm/(19.8 \times 10^{-12}\ cm^2)=7.5 \times 10^7\ \Omega$, which is almost 5 orders of magnitude higher than that of a coated filament. The electrical conductivities of cathode active materials (e.g., cobalt oxide) are lower than that of Si, making the situation even worse for cathode nanowires.

(5) In the nanowire technology of Chan, et al. [Ref. 14], each Si nanowire is only connected to a current collector through a very narrow contact area (diameter=89 nm) and, hence, the nanowire would tend to detach from the steel current collector after a few volume expansion-contraction cycles. This is also true of the nanowire-based cathode cases [20-22]. Furthermore, if fragmentation of a nanowire occurs, only the segment in direct contact with the current collector (e.g., steel plate in Chan, et al.) could remain in electronic connection with the current collector and all other segments will become ineffective since the electrons generated will not be utilized. In contrast, in the instant invention, the coating is wrapped around a filament and, even if the coating were to fracture into separate segments, individual segments would remain in physical contact with the underlying filament, which is essentially part of the current collector. The electrons generated can still be collected.

(6) The cathode material in the present invention provides a specific capacity that can be as high as 350 mAh/g (based on per gram of oxide alone). Even when the weight of the filaments is also accounted for, the maximum capacity can still be exceptionally high. For instance, in the case of a filament with a diameter of 30 nm, (radius of 15 nm), a metal oxide coating with a thickness of 10 nm, 20 nm, 30 nm, 50 nm, and 100 nm would imply a coating weight fraction of 76.6%, 89.1%, 93.6%, 97.0%, and 99.0%, respectively (assuming a metal oxide coating density of 3.7 g/cm$^3$ and carbon filament density of 2.0 g/cm$^3$). This implies that the underlying filament only occupies a very small weight fraction of the total hybrid nano material. Using 93.6% as an example, the specific capacity can still be as high 327 mAh/g (based on per gram of the coated filament). Furthermore, the Li ion batteries featuring the presently invented coated filament-based nano hybrid cathode material exhibit superior multiple-cycle behaviors with a small capacity fading and a long cycle life.

(7) For anode active materials, the present technology provides an anode active material that can reach a specific capacity of nearly 4,000 mAh/g, ten (10) times higher than that of the theoretical capacity (372 mAh/g) of a graphite-based anode active material.

These and other advantages and features of the present invention will become more transparent with the description of the following best mode practice and illustrative examples.

BRIEF DESCRIPTION OF THE DRAWINGS

FIG. 12 Specific capacities of electrochemically deposited vanadium oxide coating-nano-fiber and mixed vanadium-manganese oxide coating-nano-fiber samples.

FIG. 13 The discharge specific capacities of carbonized nano-fiber webs coated with $Li_{1+x}Mn_yFe_zPO_4$ and $LiFePO_4$, respectively. Capacities of a control sample are also included.

DETAILED DESCRIPTION OF PREFERRED EMBODIMENTS

This invention is related to anode or cathode materials for high-capacity lithium batteries, which are preferably secondary batteries based on a non-aqueous electrolyte or a polymer gel electrolyte. The shape of a lithium metal or lithium ion battery can be cylindrical, square, button-like, etc. The present invention is not limited to any battery shape or configuration.

Figure 1A:
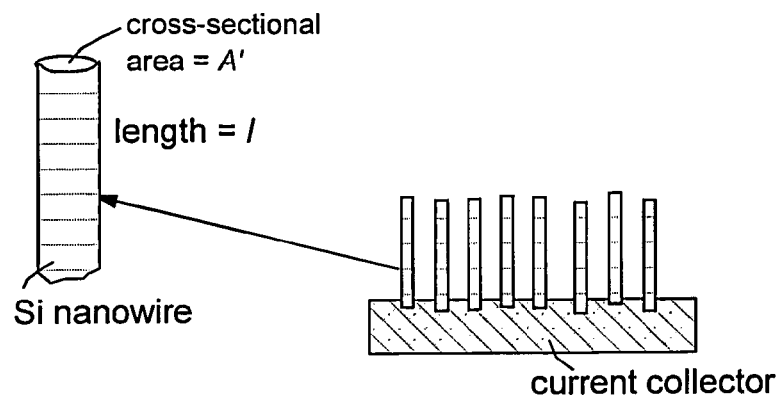
FIG. 1(A) Schematic of a prior art anode composition composed of Si nanowires catalytically grown in a direction normal to a steel current collector according to Chan, et al. [Ref. 14]; (B) Schematic of a web bonded to a current collector, wherein the web comprises networks of interconnected or intersected filaments with an electrode active material coated thereon.
Figure 1B:
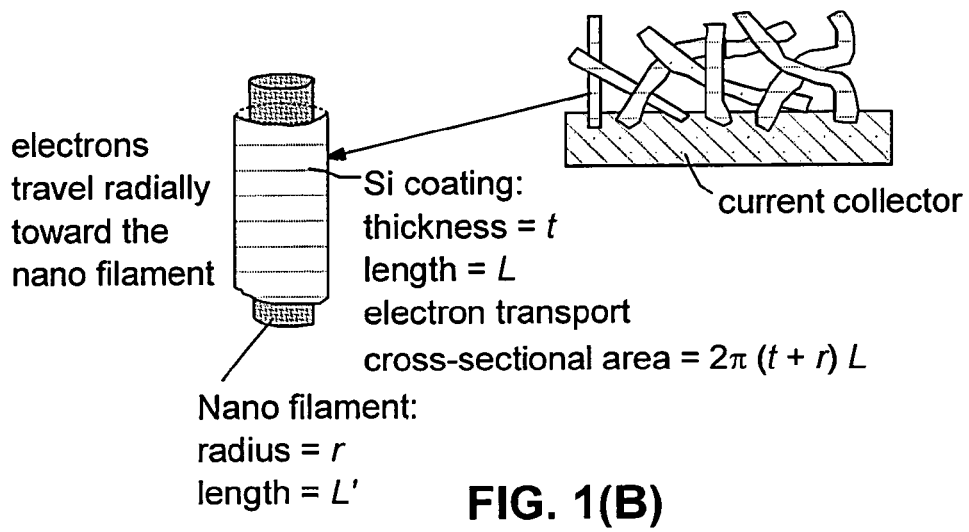
Figure 2:
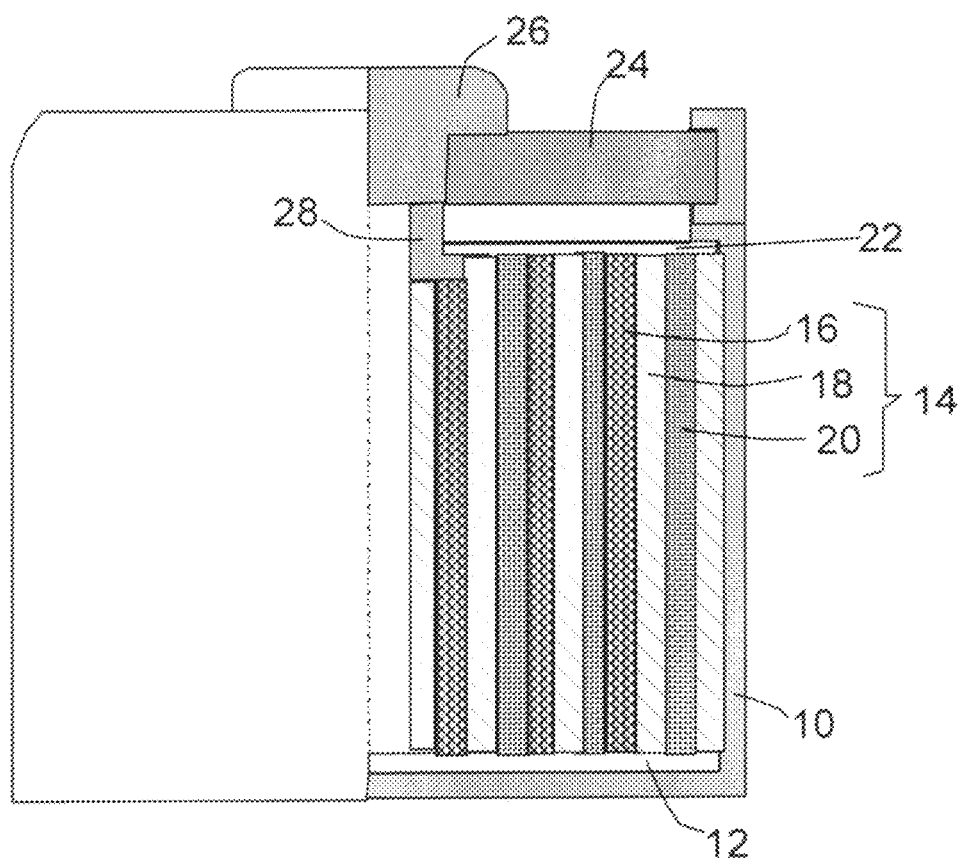
FIG. 2 Schematic of a cylinder-shape lithium ion battery.

As an example, a cylindrical battery configuration is shown in FIG. 2. A cylindrical case 10 made of stainless steel has, at the bottom thereof, an insulating body 12. An assembly 14 of electrodes is housed in the cylindrical case 10 such that a strip-like laminate body, comprising a positive electrode 16, a separator 18, and a negative electrode 20 stacked in this order, is spirally wound with a separator being disposed at the outermost side of the electrode assembly 14. The cylindrical case 10 is filled with an electrolyte. A sheet of insulating paper 22 having an opening at the center is disposed over the electrode assembly 14 placed in the cylindrical case 10. An insulating seal plate 24 is mounted at the upper opening of the cylindrical case 10 and hermetically fixed to the cylindrical case 10 by caulking the upper opening portion of the case 10 inwardly. A positive electrode terminal 26 is fitted in the central opening of the insulating seal plate 24. One end of a positive electrode lead 28 is connected to the positive electrode 16 and the other end thereof is connected to the positive electrode terminal 26. The negative electrode 20 is connected via a negative lead (not shown) to the cylindrical case 10 functioning as a negative terminal.

Preferred embodiments of the present inventions will be herein described. We choose to begin the description of the invention with a discussion on the cathode materials and processes. However, it is important to point out that the presently invented method is applicable to both cathode and anode materials. Conventional positive electrode (cathode) active materials are well-known in the art. Typically, the conventional positive electrode 16 can be manufactured by the steps of (a) mixing a positive electrode active material with a conductive additive (conductivity-promoting ingredient) and a binder, (b) dispersing the resultant mixture in a suitable solvent, (c) coating the resulting suspension on a collector, and (d) removing the solvent from the suspension to form a thin plate-like electrode. The positive electrode active material may be selected from a wide variety of oxides, such as lithium-containing nickel oxide, lithium-containing cobalt oxide, lithium-containing nickel-cobalt oxide, lithium-containing vanadium oxide, and lithium iron phosphate. Positive electrode active material may also be selected from chalcogen compounds, such as titanium disulfate or molybdenum disulfate. More preferred are lithium cobalt oxide (e.g., $Li_xCoO_2$ where $0.8 \leq x \leq 1$), lithium nickel oxide (e.g., $LiNiO_2$), lithium manganese oxide (e.g., $LiMn_2O_4$ and $LiMnO_2$), lithium iron phosphate, lithium manganese-iron phosphate, lithium vanadium phosphate because these oxides provide a high cell voltage and good cycling stability.

In the conventional cathode, acetylene black (AB), carbon black (CB), or ultra-fine graphite particles are used as a conductive additive. The binder is typically chosen from polytetrafluoroethylene (PTFE), polyvinylidene fluoride (PVDF), ethylene-propylene-diene copolymer (EPDM), or styrene-butadiene rubber (SBR), for example. Conductive materials such as electronically conductive polymers, meso-phase pitch, coal tar pitch, and petroleum pitch may also be used. Preferable mixing ratio of these ingredients may be 80 to 95% by weight for the positive electrode active material, 3 to 20% by weight for the conductive additive, and 2 to 7% by weight for the binder. The current collector may be selected from aluminum foil, stainless steel foil, and nickel foil. There is no particularly significant restriction on the type of current collector, provided the material is a good electrical conductor and relatively corrosion resistant. The separator may be selected from a polymeric nonwoven fabric, porous polyethylene film, porous polypropylene film, or porous PTFE film.

In the prior art, conventional cathode active materials, in the form of either fine particles or thin films (that are directly coated on a current collector), tend to have a low reversible specific capacity and a short cycle life due to several reasons. One primary reason is the notion that these structures tend to be crystalline and have a limited theoretical capacity. Another reason is that the particles or films tend to fracture (get pulverized or fragmented) upon charge-discharge cycling and lose contact with the current collector. In order to overcome these and other drawbacks of prior art cathode materials, we have developed a new class of cathode active materials that are based on a hybrid nano filament approach.

In one preferred embodiment, the present invention provides a method of producing a hybrid nano-filament-based cathode composition that comprises (a) an aggregate of nanometer-scaled, electrically conductive filaments that are substantially interconnected, intersected, or bonded to form a porous, electrically conductive filament network, wherein the filaments have an elongate dimension (length) and a transverse dimension (diameter) with the diameter being less than 500 nm (preferably less than 100 nm); and (b) micron- or nanometer-scaled coating that is deposited on a surface of the filaments, wherein the coating comprises a cathode active material capable of absorbing and desorbing lithium ions and the coating has a thickness less than 10 µm, preferably less than 1 µm, and most preferably less than 500 nm.

The cathode active material coating may be selected from a wide variety of oxides, such as lithium-containing nickel oxide, cobalt oxide, nickel-cobalt oxide, vanadium oxide, and lithium iron phosphate. These oxides may contain a dopant, which is typically a metal element or several metal elements. The cathode active material may also be selected from chalcogen compounds, such as titanium disulfate, molybdenum disulfate, and metal sulfides. More preferred are lithium cobalt oxide (e.g., $Li_xCoO_2$ where $0.8 \leq x \leq 1$), lithium nickel oxide (e.g., $LiNiO_2$), lithium manganese oxide (e.g., $LiMn_2O_4$ and $LiMnO_2$), lithium iron phosphate, lithium manganese-iron phosphate, lithium vanadium phosphate, and the like. These cathode active materials can be readily coated onto the surface of conductive filaments using an array of processes.

Preferably, multiple conductive filaments, intended for supporting a cathode active material coating, are processed to form an aggregate or web, characterized in that these filaments are intersected, overlapped, or somehow bonded to one another to form a network of electron-conducting paths, which are electrically connected to a current collector. Preferably, this conductive network of filaments is formed before a thin coating of a cathode active material is applied onto the exterior surface of the filaments. Certain processes are capable of producing nano fibers into a web form where individual filaments are bonded together in a natural manner. For example, electro-spinning generates multiple polymer nano fibers that overlap one another and bond to one another upon removal of the solvent used in the electro-spinning procedure. The resulting web or mat of interconnected polymer nano filaments (electro-spun nano-fibers), upon carbonization, remains an integral or interconnected network of filaments. Carbonization imparts the desired conductivity to the nano filaments. The aggregate or web has substantially interconnected pores that are intended for accommodating the electrolyte in a battery.

A particularly preferred class of electrically conductive filaments for use in the present invention is the nano fibers obtained via electro-spinning of a polymer-containing fluid [Refs. 21-23] or pitch. The main advantage of electro-spinning is the ability to produce ultra-fine fibers ranging from nanometer to submicron in diameter. The electro-spinning process is fast, simple, and relatively inexpensive. The process can be used to form fibers from a wide range of polymer liquids in a solution or melt form. The polymer may contain a desired amount of conductive additives to make the spun fibers electrically conductive. Because of the extremely small diameters and excellent uniformity of electro-statically spun fibers, high-quality non-woven fabrics or webs having desirable porosity characteristics can be readily produced by this technique. Many electro-spun polymer fibers can be subsequently heat-treated or carbonized to obtain carbon nano fibers. For instance, polyacrylonitrile (PAN), copolymers of pyromellitic dianhydride (PMDA) and 4,4'-oxydianiline (ODA), and conductive additive-containing PAN can be made into a solution, which is then electro-spun into nanometer fibers. The fibers can be successfully carbonized at 300-1,000° C. to produce carbon fiber webs with a tensile strength of 5.0 MPa (or much higher if containing carbon nano-tubes [CNTs] or nano graphene platelets [NGPs] as a conductive filler) and an electrical conductivity of >2.5 S/cm. The electrical conductivity can be increased by up to 4 orders of magnitude if the carbonized fiber is further graphitized at a temperature higher than 1,500° C. (typically in the range of 2,500 to 3,000° C.).

The nano graphene platelet (NGP) is a highly conductive nano-filler that can be incorporated in a polymer solution prior to electro-spinning. An NGP is essentially composed of a sheet of graphene plane or multiple sheets of graphene plane stacked and bonded together through van der Waals forces [Refs. 15,16]. Each graphene plane, also referred to as a graphene sheet or basal plane, comprises a two-dimensional hexagonal structure of carbon atoms. Each plate has a length and a width parallel to the graphite plane and a thickness orthogonal to the graphite plane. By definition, the thickness of an NGP is 100 nanometers (nm) or smaller, with a single-sheet NGP being as thin as 0.34 nm. The length and width of a NGP are typically between 0.5 μm and 10 μm, but could be longer or shorter.

The polymer nano fibers can be electrically conductive if the precursor polymer is intrinsically conductive (e.g., conjugate chain polymers such as polyaniline, PANi). Conductive fillers, such as carbon black, nano metal particles, CNTs, and NGPs, may be added to the polymer solution prior to electro-spinning. The resulting electro-spun fibers will be electrically conductive. A polymer fiber may become surface-conductive if the fiber surface is deposited with a conductive material, such as copper, carbon, a conductive organic, or a conductive polymer. In addition, carbonization and optional graphitization of a polymer fiber can significantly increase the electrical conductivity. A major advantage of electro-spun and carbonized nano fibers is its low cost, which can be an order of magnitude less expensive than vapor-grown carbon nano-fibers (VG-CNFs) and two orders of magnitude less expensive than CNTs.

Figure 3:
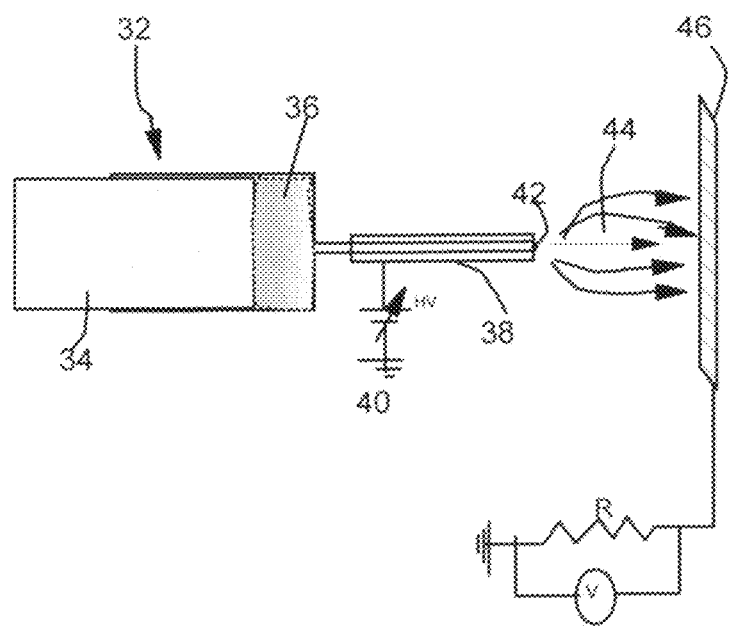
FIG. 3 Schematic of an electro-spinning apparatus.

For illustration purposes, electro-spinning of a polymer or a polymer containing a conductive additive (e.g., NGPs or carbon black) is herein described. As schematically shown in FIG. 3, the process begins with the preparation of a polymer solution and, if a conductive additive is needed, dispersion of the additive in a polymer-solvent solution to prepare a suspension solution, which is contained in a chamber 36 of a syringe-type configuration 32. The syringe may be connected to a metering pump or simply contains a drive cylinder 34, which can be part of a metering device. A metal-coated or metal syringe needle 38 serves as an electrode, which is connected to a high-voltage power supply 40. When a sufficiently high voltage is applied, charges begin to build up in the suspension. At a critical charge level, repulsive forces overcome the surface tension of the suspension, ejecting streams of fluid out of an orifice 42. The streams of suspension, in the form of thin, elongated fibrils 44, move toward a collector screen 46 while the solvent vaporizes, leaving behind dried fibrils that are collected on the screen, which may be a counter electrode that is electrically grounded or at a potential different than the potential at the needle electrode 48. The collector screen 46 serves to collect the nanocomposite fibrils produced. It may be noted that multiple syringes and needles can be operated concurrently to increase the nano-fiber production rate.

In a preferred mode of practice for producing electro-spun NGP-containing polymer nano fibers, the preparation of a suspension solution for electro-spinning is accomplished by first preparing two solutions (A=solvent+NGPs and B=solvent+polymer) and then mixing the two solutions together to obtain the suspension solution. The NGPs may be added to a solvent with the resulting suspension being subjected to a sonication treatment to promote dispersion of separate NGPs in the solvent. This fluid is a solvent for the polymer, not for the NGPs. For NGPs, this fluid serves as a dispersing medium only. The resulting suspension solution is hereinafter referred to as Suspension A. Suspension solution B is obtained by dissolving the polymer in the solvent with the assistance of heat and stirring action. Suspensions A and B are then mixed together and, optionally, sonicated further to help maintain a good dispersion of NGPs in the polymer-solvent solution.

With a syringe needle nozzle tip of approximately 2-5 μm, the resulting nanocomposite fibrils have a diameter typically smaller than 300 nm and more typically smaller than 100 nm. In many cases, fibrils as small as 20-30 nm in diameter can be easily obtained. It is of great interest to note that, contrary to what would be expected by those skilled in the art, the NGP loading in the resulting nanocomposite fibrils could easily exceed 15% by weight. This has been elegantly accomplished by preparing the suspension solution that contains an NGP-to-polymer weight ratio of 0.15/0.85 with the ratio of (NGP+polymer) to solvent being sufficiently low to effect ejection of the suspension into fine streams of fluid due to properly controlled suspension solution viscosity and surface tension. Typically, the (NGP+polymer)-to-solvent ratio is between 1/5 and 1/10. The excess amount of solvent or dispersion agent was used to properly control the fluid properties as required. The solvent or dispersing agent can be quickly removed to produce dried nanocomposite fibrils with the desired NGP loading. The NGPs have a thickness preferably smaller than 10 nm and most preferably smaller than 1 nm. Preferably, the NGPs have a width or length dimension smaller than 100 nm and further preferably smaller than 30 nm. These NGP dimensions appear to be particularly conducive to the formation of ultra-fine diameter nanocomposite fibrils containing a large loading of NGPs.

Preferred matrix polymers are polyacrylonitrile (PAN) and a mixture of polyaniline (PANi) and polyethylene oxide (PEO). PAN fibrils obtained by electro-spinning can be readily converted into carbon nano fibers by heating (or cross-linking) the polymer fibrils at a temperature of 150° C. to 300° C. in an oxidizing environment and then carbonizing the oxidized fibers at a temperature of 300° C. to 1,500° C. If further heat-treated at a temperature of 1,500° C.-3,000° C., the carbonized nano fibers become graphite nano fibers. The fibrils of the (PANi+PEO) mixture are intrinsically conductive and do not require any carbonization treatment. Electro-spinning also enables fibrils to intersect and naturally bond to one another for forming a web that has a desired network of conductive filaments. Non-conductive polymer nano-fibers may be coated with a thin layer of metal, conductive organic, or conductive polymer. Alternatively, a high carbon-yield polymer, such as phenolic resin and poly(furfuryl alcohol), may be coated onto the surface of a polymer nano-fiber. The resulting coated polymer nano-fiber is then subjected to pyrolyzation to convert the coating and the underlying polymer fiber to a polymeric carbon, thereby significantly increasing the electrical conductivity of the nano-fiber.

Figure 4:
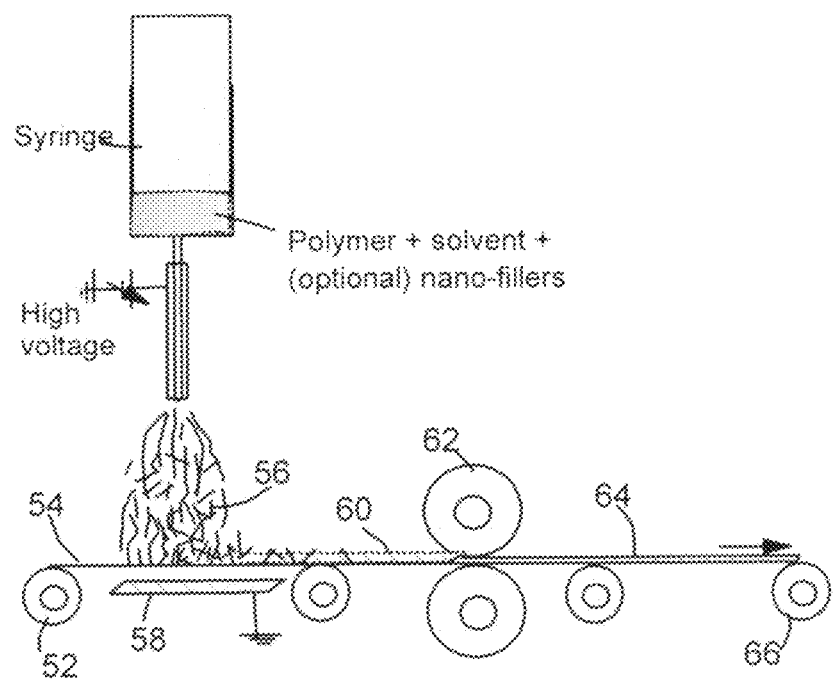
FIG. 4 Schematic of a roll-to-roll apparatus for producing a roll of mats or webs from electro-spun fibers.

Multiple filaments can be easily combined to form an aggregate, such as in a mat, web, non-woven, or paper form. In the case of electro-spun fibrils, the fibrils may naturally overlap one another to form an aggregate upon solvent removal. Schematically shown in FIG. 4 is an innovative roll-to-roll or reel-to-reel process for continuously producing rolls of electro-spun nano fibril-based porous thin film, paper, mat, or web. The process begins with reeling a porous substrate 54 from a feeder roller 52. The porous substrate 54 is used to capture the electro-spun nano fibrils 56 that would otherwise be collected by a stationary collector 58 (disposed immediately below the moving substrate), which is now just a counter electrode for the electro-spinning apparatus. The collected fibril mat 60 may be slightly compressed by a pair of rollers 62. The rollers may be optionally heated to melt out the polymer surface in the nano fibrils to consolidate the mat 64 into an integral web. The web, paper, or mat may be continuously wound around a take-up roller 66 for later uses.

The polymer nano-fiber web may be later uncoiled from a collector roller and moved into a heat treatment zone for carbonization and optional graphitization. A conductive coating may be deposited onto the surface of polymer nano-fibers through various deposition techniques; e.g., dip-coating of a conductive polymer, conductive organic, or metal (e.g., tin, zinc, or copper) or thermal physical vapor deposition of metal or chemical vapor deposition of amorphous carbon. These coating processes are well-known in the art.

The second step of the presently invented method comprises depositing a cathode or anode active material coating onto to the surfaces of conductive nano-fibers obtained from electro-spinning. The nano-fibers form a network of electron transport paths for dramatically improved electrical conductivity or reduced internal resistance (hence, reduced energy loss and internal heat build-up). It appears that the mechanical flexibility and strength of the conductive filaments (electro-spun nano-fibers) selected in the present study enables the coating to undergo strain relaxation quite freely in the radial directions during the charge-discharge cycling process of the lithium battery. Consequently, the coating remains in a good contact with the underlying filaments. Due to adequate strength and toughness, the filaments themselves remain essentially intact (not cracked or fractured) when the coating undergoes expansion or contraction. No significant fragmentation of the coating was observed in all of the hybrid nano materials investigated. Even if the coating were to get fractured into several segments, individual segments of an electrode active material are still wrapped around a conductive filament and would not lose their electrical connection the anode or cathode current collector.

The thin coating, with a thickness less than 10 μm (preferably less than 1 μm and most preferably less than 500 μm), is deposited on a surface of a nano-scaled substrate filament, preferably covering a majority of the exterior surface of the filament.

In the presently invented lithium battery featuring a hybrid nano filament type cathode, the anode may be a lithium or lithium alloy film or foil. In a lithium ion battery, the anode may be a carbon- or graphite-based material, such as graphite particles and meso-carbon micro-beads (MCMBs). For a lithium ion battery, the anode active material may also be selected from the following groups of materials:

(a) Silicon (Si), germanium (Ge), tin (Sn), lead (Pb), antimony (Sb), bismuth (Bi), zinc (Zn), aluminum (Al), and cadmium (Cd); preferably of nanocrystalline or amorphous structure in a thin film (coating) form. The coating is preferably thinner than 20 μm, more preferably thinner than 1 μm, and most preferably thinner than 100 nm;
  (b) The alloys or intermetallic compounds of Si, Ge, Sn, Pb, Sb, Bi, Zn, Al, or Cd, stoichiometric or non-stoichiometric with other elements; and
  (c) The oxides, carbides, nitrides, sulfides, phosphides, selenides, tellurides, antimonides, or their mixtures (e.g., co-oxides or composite oxides) of Si, Ge, Sn, Pb, Sb, Bi, Zn, Al, Fe, or Cd.

Preferably, the aforementioned anode active material is also based on a hybrid nano filament approach. In this case, the anode active material composition comprises (a) an aggregate of nanometer-scaled, electrically conductive filaments that are substantially interconnected, intersected, or bonded to form a porous, electrically conductive filament network, wherein the filament network comprises substantially interconnected pores and the filaments have an elongate dimension (length) and a diameter with the diameter being preferably less than 500 nm (more preferably less than 100 nm); and (b) micron- or nanometer-scaled coating that is deposited on a surface of the filaments, wherein the coating comprises an anode active material capable of absorbing and desorbing lithium ions and the coating has a thickness less than 10 μm, preferably thinner than 1 μm, and most preferably less than 500 nm. Preferably, these conductive filaments comprise electro-spun nano-fibers as described above.

Preferably, multiple conductive filaments are processed to form an aggregate or web, characterized in that these filaments are intersected, overlapped, or somehow bonded to one another to form a network of electron-conducting paths. Although not a necessary condition, a binder material may be used to bond the filaments together to produce an integral web. The binder material may be a non-conductive material, such as polyvinylidene fluoride (PVDF) and poly(tetrafluoroethylene) (PTFE). However, an electrically conductive binder material is preferred, which can be selected from coal tar pitch, petroleum pitch, meso-phase pitch, coke, a pyrolized version of pitch or coke, or a conjugate chain polymer (intrinsically conductive polymer such as polythiophene, polypyrrole, or polyaniline). Preferably, this conductive network of filaments is formed before a thin coating of an anode active material, such as Si, Ge, Sn, and $SiO_2$, is applied onto the exterior surface of the filaments. The aggregate or web has substantially interconnected pores that are intended for accommodating the electrolyte in a battery.

In either an anode or cathode featuring a presently invented hybrid nano filament active material, the most important property of a filament used to support a coating is a high electrical conductivity. This will enable facile collection of the electrons produced by the anode active material or the transport of the electrons reaching the cathode active material with minimal resistance. A low conductivity implies a high resistance and high energy loss, which is undesirable. The filament should also be chemically and thermo-mechanically compatible with the intended coating material to ensure a good contact between the filament and the coating during the cycles of repeated charging/discharging and heating/cooling. As an example, a Si-based coating can undergo a volume expansion up to a factor of 4 (400%) when Si absorbs Li ions to its maximum capacity (e.g., as represented by $Li_{4.4}Si$). As another example, the cobalt oxide coating may also undergo a volume change greater than 40%. By contrast, conventional anode active or cathode active materials in a powder or thin-film form (e.g., Si powder and $LiCoO_2$ film deposited on a current collector surface) have a great propensity to get fragmented, losing contact with the current collector.

A wide range of processes can be used to deposit a thin coating of a cathode active or anode active materials, including, but not limited to, physical vapor deposition (PVD), plasma-enhanced PVD, chemical vapor deposition (CVD), plasma-enhanced CVD, hot wire CVD, vacuum plasma spraying, air plasma spraying, sputtering, reactive sputtering, dip-coating (e.g., dip-coating in a metal melt, solution coating followed by solvent evaporation, liquid coating followed by thermal or chemical conversion, etc), spin coating, electron beam induced deposition, laser beam induced deposition, atomization, combined atomization/reaction, electrochemical deposition, electrophoretic deposition, sol-gel coating, and a combination thereof. It may be noted that although any one of these thin-film deposition techniques by itself is well-known in the art, they have been mostly used in the fabrication of semiconductor devices. After an extensive research and development work, we have surprisingly observed that these techniques can be adapted for depositing anode or cathode active materials onto electro-spun nano-fibers in a very uniform fashion. Equally surprisingly, the resulting thin-film coatings have superior compatibility with the underlying conductive polymer nano-fibers or carbonized-graphitized nano-fibers. Furthermore, upon repeated charges and discharges, the coating integrity is well-maintained, leading to a long battery cycle life. This was not recognized or taught in the prior art.

Thin films of cobalt oxide have been prepared from various deposition techniques, such as spray pyrolysis, sputtering, chemical vapor deposition (CVD), pulsed laser deposition, sol-gel process, electrophoretic deposition (EPD), spin coating, and dip coating, on a variety of substrates. Each deposition technique offers different advantages. For example, EPD is an effective, fast and controllable process for depositing various thin film layers on curved or cylindrical shaped substrates. The CVD process provides uniform deposition over large areas, good coverage, and selective deposition. The pulsed-injection metal organic chemical vapor deposition (MOCVD) technique produces the coating with well-controlled film composition, microstructure and morphology, through a suitable choice of the substrate, precursor and reactant, as well as the deposition conditions.

The anode active material for use in the presently invented lithium ion battery preferably includes at least one of silicon (Si), germanium (Ge), and tin (Sn) as an element. This is because silicon, germanium, and tin have a high capability of inserting and extracting lithium, and can reach a high energy density. The next preferred group of elements includes lead (Pb), antimony (Sb), bismuth (Bi), zinc (Zn), aluminum (Al), and cadmium (Cd). When any of these two sets of elements are included as a primary element of an electro-active material (defined as being capable of absorbing and extracting lithium ions in the present context), which is deposited on filaments, the cycling stability of the resulting anode material can be significantly improved.

Another preferred class of anode active material that can be deposited on the surface of filaments include the oxides, carbides, nitrides, sulfides, phosphides, selenides, tellurides, or their mixtures (e.g., co-oxides or composite oxides) of: (a) Si, Ge, Sn, Pb, Sb, Bi, Zn, Al, Fe, or Cd for anode active materials; or (b) Co, Ni, Mn, V, Ti for cathode active materials. They can be readily produced in a thin-film or coating form. For instance, Sn alone may be vaporized using an arc plasma heating technique to produce Sn vapor in a reactor and, concurrently, a stream of oxygen gas is introduced into the reactor to react with Sn vapor. The reaction product, SnO, is in a nano cluster form, which can be directed to deposit onto a desired substrate (e.g., a web of carbonized nano-fibers). Alternatively, Sn admixed with B, Al, P, Si, Ge, Ti, Mn, Fe, or Zn may be subjected to co-vaporization and an oxidative reaction to obtain composite oxides. The $SnS_2$ coating may be deposited onto a web of filaments by placing the web in a reaction chamber, into which are introduced two streams of reactants—a stream of Sn vapor produced by arc plasma heating and a stream of S vapor obtained by sublimation or vaporization.

Again, the active material in a thin film or coating form on a surface of a web of filaments may be formed through liquid-phase deposition, electrodeposition, dip coating, evaporation, physical vapor deposition, sputtering, CVD, or the like. The single-element coating is preferably formed by the dip-coating method among them, because the deposition of an extremely small amount of the active material (e.g., Si, Sn or Ge) onto a conductive polymer nano-fiber or carbonized (and optionally graphitized) nano-fiber can be easily and controllably achieved. This is a highly surprising result since those skilled in the art would think that dip coating could not lead to device-quality coatings.

Alternatively, an amorphous or nanocrystalline coating may be obtained from chemical vapor deposition (CVD) of an organic precursor. CVD is accomplished by placing a substrate (e.g., a web of conductive filaments) in a reactor chamber and heating the substrate to a certain temperature. Controlled amounts of silicon or nitride source gases, usually carried by either nitrogen and/or hydrogen, are added to the reactor. Dopant gases may also be added if desired. A reaction between the source gases and the substrate occurs, thereby depositing the desired silicon, silicon oxide, or silicon nitride layer. Atmospheric CVD or low pressure CVD (LPCVD) for the deposition of Si, silicon oxide, or silicon nitride coatings, for instance, is normally conducted at a temperature of approximately 500-1,100° C. Commonly used silicon and nitride sources are silane ($SiH_4$), silicon tetrachloride ($SiCl_4$), ammonia ($NH_3$), and nitrous Oxide ($N_2O$). Dopant sources, when needed, are arsine ($AsH_3$), phosphine ($PH_3$), and diborane ($B_2H_6$). Commonly used carrier gases are nitrogen ($N_2$) and hydrogen ($H_2$). Heating sources include radio frequency (RF), infrared (IR), or thermal resistance.

Similarly, coatings of amorphous germanium (Ge) and other metallic or semi-conducting elements can be produced by a variety of methods, for instance, by sputtering, vacuum evaporation, plasma deposition, and chemical vapor deposition at approximately atmospheric pressure. For instance, controllably dopable amorphous germanium can be produced by means of low pressure chemical vapor deposition at a reaction temperature between about 350° C. and about 400° C., in an atmosphere comprising a Ge-yielding precursor such as $GeI_4$, at a pressure between about 0.05 Torr and about 0.7 Torr, preferably between about 0.2 and 0.4 Torr.

Polysilanes and polysiloxanes (two types of Si-containing polymers) are commonly used to make silicon carbide via pyrolyzation. However, by heating to a lower temperature, silicon oxycarbides (Si—C—O) can be made. A silicon film may be deposited onto a web of electro-spun nano-fibers by coating this web with a polysilane solution and then thermally decomposing polysilane to obtain a silicon film. Silicon film may be obtained from a cyclosilane compound consisting of silicon atoms and hydrogen atoms (Matsuki, et al., "Cyclosilane compound, and solution composition and process for forming a silicon film" U.S. Pat. No. 6,503,570, Jan. 7, 2003). This cyclosilane compound provides a high-purity and solvent-soluble polysilane by the radical ring-opening addition polymerization of a cyclopentasilane without producing a salt as a by-product. Silicon thin films may be formed by dip-coating silane-containing compounds on the nano-fiber surface, followed by heat, light, or laser treatment so that Si-coated nano-fibers are easily manufactured at low cost. Although this approach has been successfully used to produce thin Si films on a flat and smooth surface (e.g., for solar cell panel fabrication, as disclosed by Furusawa, et al. in "Method for manufacturing solar battery" U.S. Pat. No. 6,518,087, Feb. 11, 2003), hitherto no attempt has been made to use this approach for depositing thin Si coating on nano-fiber surfaces. It was quite surprising for us to observe uniform Si coating on the carbonized, electro-spun PAN nano-fibers. In our initial studies, this coating was obtained from cyclopentasilane and cyclopentasilane, but the silicon compounds used can include other species, such as silylcyclopentasilane, silylcyclohexasilane, and cycloheptasilane.

Compared to CVD, this step of dip-coating, followed by chemical or thermal conversion, is particularly attractive due to several reasons: (1) With few exceptions, CVD methods are known to have a relatively low production yield due to apparatus contamination and generation of foreign species in a gas phase; (2) In CVD processes, generally speaking, a film having uniform thickness is difficult to obtain on a surface having concave-convex areas; (3) In general, CVD productivity is low since the growth rates of films are low and complicated; (4) In general, expensive high-frequency generators and vacuum equipment are required for plasma CVD; and (5) Handling of silicon hydrides in gas forms is more difficult due to its toxicity and strong reactivity. The combined dip-coating/conversion approach overcomes these shortcomings.

It may be further noted that the cyclohexane compounds may be thermally converted into silicon at a temperature typically in the range of 300-1,000° C., which happens to be identical to the typical carbonization temperature range. This surprising observation led us to attempt a co-conversion treatment; i.e., the carbonization of polymer nano-fibers (the substrate) and the thermal conversion of cyclosilane compounds (the precursor coating) to silicon were conducted substantially concurrently. This innovative process resulted in the formation of silicon coating extremely well-bonded to its underlying carbonized nano-fibers. With a conversion temperature lower than 550° C., the Si coating tends to be amorphous. With a conversion temperature higher than 550° C., the Si coating tends to be nano-crystalline or polycrystalline. Conversion of cyclohehane can be accomplished by using infrared, ultraviolet, and/or heat.

For cathode active materials, cobalt oxide films may be prepared on filament web substrates at 150-400° C. by plasma-enhanced metalorganic chemical vapor deposition using cobalt (II) acetylacetonate as a source material. They may also be prepared by the pulsed liquid injection chemical vapor deposition technique from a metal-organic material, such as cobalt (II) acetylacetonate, as the precursor, oxygen as the reactant, and argon as the carrier gas. The cobalt oxide formation process may also be accomplished electrochemically in alkaline solution (e.g., 30 mM NaOH) containing milli-molar concentrations of $CoCl_2$ and ligand species, such as sodium citrate. Alternatively, reactive sputtering may also be utilized to prepare thin films of cobalt oxide on a web surface.

A manganese precursor, tris(dipivaloylmethanato) manganese [$Mn(DPM)_3$], may be used in liquid-delivery, metallorganic chemical vapor deposition (MOCVD) for the formation of manganese oxide films (coatings). Plasma-assisted reactive radio frequency magnetron sputtering deposition is useful for the fabrication of vanadium oxide films on various substrates. Vanadium oxide materials can be prepared by electrochemical deposition in the presence of surfactants. Oxides of vanadium, 190-310 nm thick, can be deposited by ion-beam sputtering of a metallic target. The ion beam may consist of an argon-oxygen mixture where the oxygen percentage is varied from 10% to 50%. Vanadium oxide thin films may also be deposited by pulsed laser deposition (PLD) technique using $V_2O_5$ as a target material.

Thin film nickel oxides may be prepared by reactive RF sputtering, chemical vapor deposition, anodic oxidation of nickel, and by cathodic precipitation of nickel hydroxide, etc. For instance, nickel oxide may be prepared by chemical processes which include depositing nickel film by an electroless (or chemical deposition) method, followed by oxidation by $H_2O_2$. The CVD process may also be utilized for the deposition of nickel oxide films with $Ni(C_5H_5)_2$(bis-cyclopentadienyl nickel)/$O_2$ as the precursor materials at various temperatures and $O_2$ flow rates.

Lithium iron phosphate $LiFePO_4$ is a promising candidate of cathode material for lithium-ion batteries. The advantages of $LiFePO_4$ as a cathode active material includes a high theoretical capacity (170 mAh/g), environmental benignity, low resource cost, good cycling stability, high temperature capability, and prospect for a safer cell compared with $LiCoO_2$. The major drawback with this material has low electronic conductivity, on the order of $10^{-9}$ S/cm$^2$. This renders it difficult to prepare cathodes capable of operating at high rates. In addition, poor solid-phase transport means that the utilization of the active material is a strong function of the particle size. The presently invented hybrid nano filament approach overcomes this major problem by using a nano-scaled coating (to reduce the Li ion diffusion path and electron transport path distance) deposited on the surface of conductive filaments (that help collect the electrons). Lithium iron phosphate ($LiFePO_4$) thin film coatings may be prepared by pulsed laser deposition (PLD). The target material of $LiFePO_4$ for PLD may be prepared by a solid state reaction using $LiOH.H_2O$, $(CH_3COO)_2Fe$, and $NH_4H_2PO_4$ as raw materials. Additionally, $Li_{1.3}A_{0.3}Ti_{1.7}(PO_4)_3$ thin films may be successfully prepared by the solution deposition using lithium acetate, aluminum nitrate, ammonium dihydrogen phosphate and titanium butoxide as starting materials. This is but one example of a host of complex metal phosphate-based cathode materials.

Other cathode active coatings may be deposited on a web surface using similar processes. For instance, manganese sulfide (γ-MnS) thin films may be prepared on a substrate by chemical bath deposition (CBD) method at room temperature (27° C.). Further, both manganese and cobalt sulfide thin film coatings can be produced by a hot-wall, aerosol-assisted chemical vapor deposition method.

Combined atomization (or vaporization) and reaction can be used to obtain the oxides, carbides, nitrides, sulfides, phosphides, selenides, tellurides, or their mixtures, as illustrated in W. C. Huang, "Method for the Production of Semiconductor Quantum Particles," U.S. Pat. No. 6,623,559 (Sep. 23, 2003) and J. H. Liu and B. Z. Jang, "Process and Apparatus for the Production of Nano-Scaled Powders," U.S. Pat. No. 6,398,125 (Jun. 4, 2002).

A wide range of electrolytes can be used for practicing the instant invention. Most preferred are non-aqueous and polymer gel electrolytes although other types can be used. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (.gamma.-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably 0.5 to 2.0 mol/l.

EXAMPLES

In the examples discussed below, unless otherwise noted, raw materials such as silicon, germanium, bismuth, antimony, zinc, iron, nickel, titanium, cobalt, and tin were obtained from either Alfa Aesar of Ward Hill, Mass., Aldrich Chemical Company of Milwaukee, Wis. or Alcan Metal Powders of Berkeley, Calif. X-ray diffraction patterns were collected using a diffractometer equipped with a copper target x-ray tube and a diffracted beam monochromator. The presence or absence of characteristic patterns of peaks was observed for each of the alloy samples studied. For example, a phase was considered to be amorphous when the X-ray diffraction pattern was absent or lacked sharp, well-defined peaks. The grain sizes of the crystalline phases were determined by the Scherer equation. When the grain size was calculated to be less than 50 nanometers, the phase was considered to be nanocrystalline. In several cases, scanning electron microscopy (SEM) and transmission electron microscopy (TEM) were used to characterize the structure and morphology of the hybrid material samples.

In a typical procedure, a web of coated filaments was bonded, with a conductive adhesive, onto a copper foil (for anode) or aluminum foil (for cathode) as a current collector. In some cases, webs of filaments were bonded to a current collector prior to the coating procedure. An NGP-containing adhesive was used as a conductive binder for this purpose. Filaments may also be bonded by an intrinsically conductive polymer. For instance, polyaniline-maleic acid-dodecyl hydrogensulfate salt may be synthesized directly via emulsion polymerization pathway using benzoyl peroxide oxidant, sodium dodecyl sulfate surfactant, and maleic acid as dopants. Dry polyaniline-based powder may be dissolved in DMF up to 2% w/v to form a solution.

For the preparation of control samples (particle-based), the cathode of a lithium battery was prepared in the following way. First, 80% by weight of lithium cobalt oxide powder $LiCoO_2$, 10% by weight of acetylene black, and 10% by weight of ethylene-propylene-diene monomer powder were mixed together with toluene to obtain a mixture. The mixture was then coated on an aluminum foil (30 μm) serving as a current collector. The resulting two-layer aluminum foil-active material configuration was then hot-pressed to obtain a positive electrode.

A positive electrode, a separator composed of a porous polyethylene film, and a negative electrode was stacked in this order. The stacked body was spirally wound with a separator layer being disposed at the outermost side to obtain an electrode assembly as schematically shown in FIG. 2. Hexafluorolithium phosphate ($LiPF_6$) was dissolved in a mixed solvent consisting of ethylene carbonate (EC) and methylethyl carbonate (MEC) (volume ratio: 50:50) to obtain a non-aqueous electrolyte, the concentration of $LiPF_6$ being 1.0 mol/l (solvent). The electrode assembly and the non-aqueous electrolyte were placed in a bottomed cylindrical case made of stainless steel, thereby obtaining a cylindrical lithium secondary battery.

The following examples are presented primarily for the purpose of illustrating the best mode practice of the present invention, not to be construed as limiting the scope of the present invention.

Example 1

Conductive Web of Filaments from Electro-Spun PAA Fibrils

Poly(amic acid) (PAA) precursors for spinning were prepared by copolymerizing of pyromellitic dianhydride (Aldrich) and 4,4'-oxydianiline (Aldrich) in a mixed solvent of tetrahydrofurane/methanol (THF/MeOH, 8/2 by weight). The PAA solution was spun into fiber web using an electrostatic spinning apparatus schematically shown in FIG. 3. The apparatus consisted of a 15 kV d.c. power supply equipped with a positively charged capillary from which the polymer solution was extruded, and a negatively charged drum for collecting the fibers. Solvent removal and imidization from PAA were performed concurrently by stepwise heat treatments under air flow at 40° C. for 12 h, 100° C. for 1 h, 250° C. for 2 h, and 350° C. for 1 h. The thermally cured polyimide (PI) web samples were carbonized at 1,000° C. to obtain Sample c-PI-0 with an average fibril diameter of 67 nm.

Example 2

Conductive Web of Filaments from Electro-Spun PAN Fibrils and NGP-Containing PAN Fibrils Suspension solutions were obtained by first preparing two solutions (A=solvent+NGPs and B=solvent+polymer) and then mixing the two solutions together to obtain the suspension solution. In the case of NGP-PAN fibril, the solvent used was N,N,-dimethyl formamide (DMF). For the preparation of Suspension A, the NGPs were added to a solvent and the resulting suspensions were sonicated to promote dispersion of separate NGPs in the solvent with a sonication time of 20 minutes. Suspension solution B was obtained by dissolving the polymer in the solvent with the assistance of heat (80° C. for DMF+PAN) and stirring action using a magnetic stirrer typically for 90 and 30 minutes, respectively. Suspensions A and B were then mixed together and further sonicated for 20 minutes to help maintain a good dispersion of NGPs in the polymer-solvent solution. An electrostatic potential of 10 kV was applied over a distance of 10 cm between the syringe needle tip and a 10 cm×10 cm porous aluminum plate that was grounded.

A range of NGP-polymer proportions in the original suspension solution were prepared (based on (NGP wt.)/(NGP wt.+polymer weight)): 0%, 5%, and 10% for PAN compositions. The resulting nanocomposite fibrils, after the solvent was completely removed, had comparable NGP-polymer ratios as the original ratios. They are designated as Samples PAN-0, PAN-5, and PAN-10, respectively. The average diameter of these fibrils was approximately 75 nm.

The NGP-PAN nanocomposite fibrils were converted to carbon/carbon composite nano-fibers by heat-treating the fibrils first at 200° C. in an oxidizing environment (laboratory air) for 45 minutes and then at 1,000° C. in an inert atmosphere for 2 hours. The resulting carbonized samples are referred to as Samples c-PAN-5 and c-PAN-10, respectively. NGP-free PAN fibrils were also carbonized under comparable conditions to obtain Sample c-PAN-0. Their diameters became approximately 55 nm.

Example 3

Chemical Vapor Deposition of Si on Conductive Webs for the Preparation of an Anode Configuration in Partnership with a Presently Invented Cathode The CVD formation of silicon films on several webs prepared in Examples 1 and 2 were carried out using a mixture of monosilane ($SiH_4$) and hydrogen gas. The process was performed between 500° C. and 800° C. with a silane partial pressure of 0.2 to 10 mbar to a total pressure of the silane-hydrogen mixture of 100 to 990 mbar. The growth rates were found to vary from approximately 55 nm/hour to 10 μm/min.

Hexachlorodisilane ($Si_2Cl_6$) is a silicon halide dimer that is an excellent alternative to silane ($SiH_4$) and mono-silicon chlorides ($SiH_2Cl_2$) as a source for chemical vapor deposition (CVD) of silicon, silicon nitride, silicon dioxide, and metal silicide films. $Si_2Cl_6$ is a non-flammable liquid which, due to its room temperature vapor pressure of 4 mm, can be conveniently transported to a CVD reactor by passing $H_2$ or an insert gas through a bubbler containing the liquid. The thermal decomposition also could proceed in the absence of hydrogen. Thin-film coatings may be deposited at lower temperatures than those required for $SiCl_4$ (1,100° C.) or $SiH_2Cl_2$ and is safer than using spontaneously flammable $SiH_4$.

Silicon coatings were prepared in a horizontal hot-walled system by passing $Si_2Cl_6$ vapor in either a nitrogen or hydrogen carrier gas over horizontal substrates at temperatures from 425° C. to 850° C. In an atmospheric pressure system with a $Si_2Cl_6$ flow rate of 7×10$^{-3}$ moles/hr (or 400 cc/min of gas through bubbler) in 2,000 cc/min of carrier gas, the growth rate could vary from 50 nm/hr at 450° C. to 20 μm/min at 850° C., depending upon the flow rate. Above 700° C. the growth rate increases sharply with temperature. Presumably the growth rate would further increase above 850° C., but it would become more challenging to control the coating uniformity. Below 700° C. the growth rate is less temperature dependent.

CVD coatings with a thickness of approximately 85 nm were deposited on the surfaces of Sample c-PAN-5 and Sample c-PAN-10.

It may be noted that CVD coating can be a continuous process amenable to low-cost mass production. For instance, Kirkbride, et al., (U.S. Pat. No. 4,019,887, Jun. 10, 1975) have proposed a continuous CVD coating process that can be adapted for silicon, silicon oxide, and other coatings on the conductive webs. A coating containing silicon can be produced on a web by moving the web, at a temperature of 400-850° C., past a coating station to which silane-containing gas is supplied. The gas is released close to the glass surface into a hot zone opening towards the web surface and at a substantially constant pressure across that surface. Non-oxidizing conditions are maintained in the hot zone, and the coating is produced by pyrolysis of the gas on the web surface. For the production of silicon oxide and nitride coatings, the reactant gases can contain $CO_2$ and $NH_3$, respectively.

The ability to mass produce coated webs (e.g., based on low-cost electro-spun fibrils and NGPs) makes the present invention particularly attractive for industrial-scale manufacturing of lithium ion anodes. This is in sharp contrast to the approach proposed by Chan, et al. [Ref. 14] that entails growing Si nano wires from a steel current collector, which is a slow and expensive process.

Example 4

Chemical Vapor Deposition of $SnO_x$ on Conductive Filament Webs for the Preparation of an Anode Configuration Monobutyltin trichloride ($C_4H_9SnCl_3$) was vaporized by heating to 150° C. in an evaporator. A carrier gas, which was nitrogen gas generated by a compressor and maintained at a pressure of 1 kg/cm$^2$ by a reduction valve, was sent to the evaporator at a flow rate of 50 liters/min. The vapor of the tin compound was carried on the carrier gas and sent to a mixer. The vapor of the tin compound mixed in the mixer was impinged onto the surface of a conductive web (Sample c-PAN-0) kept at a high temperature of 575° C.-750° C. and conveyed by a conveying roller to form a tin oxide coating on the web surface. The web was caused to travel at a speed of 1 m/min by the conveying roller. Under these conditions, the tin oxide coating was formed for 10 minutes. The thickness of the resulting tin oxide coating was found to be from 60 nm to 210 nm.

Example 5

Physical Vapor Deposition of Sn or Tin Alloys on Conductive Webs

About 5 grams of Sn powder were put in a tungsten heating boat. Approximately 5 grams of a carbonized electro-spun nano-fibers (Sample c-PAN-0) supported by a quartz plate of 30 cm×5 cm and the Sn-loaded tungsten boat were mounted in a vacuum chamber, which was evacuated to and maintained at a pressure of $10^{-5}$ torr for 3 hours at room temperature. An electric current was passed directly on the tungsten boat to heat the loaded Sn up to 240° C., which is slightly above its melting point. The evaporation was controlled by monitoring the deposited thickness with a quartz crystal microbalance mounted near the web. The deposition rate was controlled to be about 2 nm/min and the deposition time was approximately 1 hours. The resulting product was a hybrid material containing a Sn thin film coating (approximately 125 nm thick) on the conductive web. A Sn alloy-coated web was prepared under comparable conditions. To obtain Sn alloy coatings, a desired amount of alloying elements (e.g., Bi with a melting point of 271.4° C.) was loaded to the same or a different tungsten boat (now at a temperature higher than the melting point of Bi). The alloying element was then heated to above its melting point, generating another stream of vapors, which co-deposited with Sn on the web substrate.

Example 6

Dip Coating of Liquid Polysilane on Carbonized Nano-Fibers, Followed by Chemical/Thermal Conversion Approximately one (1) g of cyclohexasilane was dissolved in 20 g of toluene to obtain a coating solution. A web of electro-spun nano-fibers (c-PAN-0) was immersed in this solution for one minute, taken out of the solution, dried at 150° C. for 10 minutes, and then pyrolyzed at 450° C. in an argon atmosphere containing 3% hydrogen for one hour. This procedure yielded an amorphous silicon coating of 75 nm thick on the carbonized nano-fiber surface. By carrying out another cycle of dipping, drying, and pyrolyzing one could add additional 65 nm to the coating thickness.

Example 7

Concurrent Pyrolyzation of Polysilane Coating and the Underlying Polymer Nano-Fiber Substrate Approximately one (1) g of cyclohexasilane was dissolved in 20 g of toluene to obtain a coating solution. A web of electro-spun PAN nano-fibers (pre-oxidized at 250° C. for 30 minutes) was immersed in this solution for two minutes, taken out of the solution, and then dried at 150° C. for 10 minutes. The resulting polysilane-coated oxidized PAN nano-fibers were then pyrolyzed at 450° C. in an argon atmosphere containing 3% hydrogen for 10 minutes and then 800° C. for one hour. The end result was a web of an amorphous silicon film with a thickness of approximately 65 nm coated on the surface of carbonized nano-fibers.

Example 8

Dip-Coating of Nano-Fiber Webs in Si Melt

A particularly simple and effective coating process is dip coating of a substrate in a molten metal. Specifically, a useful web coating process in practicing the present invention was adapted from that of Heaps, et al., "Method for dip-coating ceramic with molten silicon," U.S. Pat. No. 4,112,135 (Sep. 5, 1978). Heaps, et al., observed that many ceramics (e.g., mullite, alumina and zirconia), when brought into contact with molten silicon, were not wet by the silicon and no coating took place. They overcame this problem by first carbonizing the surface of such a substrate and then contacting the carbonized surface of the ceramic with the molten silicon, whereupon a large-grain silicon coating was produced wherever the ceramic was carbonized. In this way the ceramic of the type which was not wetted by molten silicon could be successfully coated with silicon. However, there was no report that silicon melt was capable of wetting the surface of either a vapor-grown carbon nano-fibers or polymeric carbon nano-fibers (carbonized, electro-spun nano-fibers). Further, the prior art did not teach explicitly or implicitly about silicon coating on polymeric carbon nano-fibers via melt dip coating or any other route. After extensive work, we found that molten silicon was capable of wetting all the carbon-based nano filaments, including vapor-grown and electro-spun and carbonized (with or without subsequent graphitization). In a laboratory procedure, one could just quickly dip a piece of the conductive web into and out of a bath of molten Si in a non-oxidizing or protective (helium) gas atmosphere. The coating thickness was determined by how fast the web was withdrawn from the bath. One could easily achieve a coating thickness of from less than one hundred nanometers to tens of microns in a matter of 1 second to 10 seconds. Samples c-PI-0 and Sample c-PAN-0 were subjected to dip coating treatments to obtain a coating with a thickness of 230 nm and 175 nm, respectively.

Example 9

Plasma-Enhanced CVD of Cobalt Oxide Coatings for the Cathode

Cobalt oxide films were prepared on Sample c-PI-0 (average fibril diameter of 67 nm) as a substrate by plasma-enhanced metal-organic chemical vapor deposition using cobalt (II) acetylacetonate as a source material. NaCl-type $CoO_x$ films ($x \geq 1$) were formed at low $O_2$ flow rate of 7 $cm^3$/min and at a substrate temperature of 150-400° C. Deposition rates of the $CoO_x$ films were approximately 40-45 nm/min at 400° C. The coating thickness was from 85 nm to 115 nm (Cathode Sample c-PI-0-CoO). A control sample was prepared by combining $LiCoO_2$ particles with 10% carbon black as a conductive additive and 10% PVDF as a binder (Control Sample CoO).

Example 10

Electrochemical Deposition of Cobalt Oxide Coatings for the Cathode

The cobalt oxide formation process can be accomplished in alkaline solution (e.g., 30 mM LiOH) containing milli-molar concentrations of $CoCl_2$ and ligand species, such as lithium citrate. In the present study, the cobalt oxide films were obtained by voltage cycling of a carbonized nano fiber web (from Samples c-PAN-5) between 0.4 and 1.1 V versus SCE. The depositions were performed in non-deaerated 30 mM LiOH solutions at pH 12.5 containing 30 mM lithium citrate and 5 mM of $CoCl_2$. A cobalt oxide coating of approximately 175 nm was deposited on the cylindrical perimeter surface of carbonized PAN nano fibers (Cathode Sample Samples c-PAN-0-CoO).

Example 11

Dip-Coating Deposition of Manganese Oxide for the Cathode

A surface of a sheet of carbonized nano-fiber web (from Sample c-PAN-0) was bonded to a Cu foil using a conductive adhesive (a mixture of 30% by weight of NGPs and 70% of epoxy resin). The assembly was degreased with acetone, rinsed in de-ionized water, etched in a solution of 0.1 M HCl at room temperature for 10 min, and subsequently rinsed with de-ionized water. The solution for dip-coating deposition was prepared by dissolving potassium permanganate in de-ionized water and adjusting the acidity with 2.5 M $H_2SO_4$ to obtain a final solution of 0.25 M $KMnO_4$ with 0.5 M $H_2SO_4$. The web assembly electrode was then placed vertically in a beaker containing the freshly prepared solution of $KMnO_4$+ $H_2SO_4$, which was continuously stirred during the deposition. The deposition procedure was carried out at room temperature for durations of 2, 5, 10, 15, 20, 30 and 60 min, respectively. The coatings were thoroughly rinsed with de-ionized water and dried in a vacuum oven at room temperature for 24 hours. The coating thickness was approximately between 80 nm and 1.5 μm, depending on the deposition time. A web with a manganese oxide coating thickness of approximately 145 nm (Cathode Sample c-PAN-0-MnO) was used for the electrochemical cycling study. The coating appears to be substantially amorphous.

Example 12

CVD of Manganese Oxide for the Cathode

A manganese precursor, tris(dipivaloylmethanato) manganese [$Mn(DPM)_3$], was used in a liquid delivery metallorganic chemical vapor deposition (MOCVD) process for the formation of manganese oxide films (coatings) on the filament surface of a c-PAN-5 web. A solution of $Mn(DPM)_3$ in tetrahydrofuran (THF, $C_4H_8O$) was used as a liquid manganese source material for the deposition of oxide films. $Mn(DPM)_3$ was dissolved in THF at a concentration of 0.1 mol/L. The resulting solution was vaporized by a vaporizer (at 240° C.) and transported by a carrier gas ($N_2$) at a flow rate of 200 sccm into a MOCVD reactor where $Mn(DPM)_3$ was mixed with $O_2$ oxidant gas. The actual flow rate of the $Mn(DPM)_3$/THF solution vapor was 0.5 sccm. The pressure in the reactor was maintained at 10 Torr. Manganese oxide films were deposited on the web for a deposition time of 20 min, resulting in an amorphous manganese oxide coating 95 nm thick. The atomic composition of the films was measured by X-ray photoelectron spectroscopy (XPS) after etching of the film surface.

Example 13

Electrochemical Deposition of Vanadium Oxide for the Cathode

Vanadium oxide coating materials were prepared by electrochemical deposition from metal species in a 20 mL of a 0.2 M $VOSO_4$ aqueous solution. A c-PAN-0 nano-fiber web and a stainless steel plate were used as the working and counter electrode, respectively. Prior to deposition, the steel electrode was polished with sandpaper and washed repeatedly with deionized water and acetone. Electrodes were weighed before and after deposition to determine the net weight of the deposit. Electrochemical oxidation was performed using constant current electrolysis at a temperature of 50-60° C. for 1 h. For a current density of 1 $mA/cm^2$, the potential drop across the cell was approximately 1.1 V. The coating on the CNF web electrode was smooth and exhibited a dark green color. The resulting electrode was washed with water and then dried at 160° C. for 12 h. The thickness of vanadium oxide on the filament surface was approximately 220-240 nm.

Example 14

Electrochemical Deposition of Mixed Vanadium and Manganese Oxide Coatings for the Cathode Complex multi-component oxide systems of the type $LiCo_xMn_{2-x}O_4$, $LiCr_yMn_{2-4y}O_4$, and $Co_2V_2O_7 \cdot xH_2O$, prepared by doping of traditional electrochemically active oxides of manganese, vanadium, etc., are interesting cathode materials of lithium batteries, due to their considerably higher electrolytic characteristics compared to single-metal oxide materials. These systems are mainly prepared by thermal synthesis from stoichiometric mixtures of metal salts. In this study, we used mixed solutions of oxo-vanadium and manganese (II) sulfates of the overall average concentration of 0.35 M at a V:Mn concentration ratio of 5:1-1:5. Here, the first figures stand for the main component (i.e., for oxo-vanadium sulfate) and the second, for the doping component. Solutions were prepared from pure reagents and distilled water. The electrolysis was performed in a temperature-controlled glass cell of 250-ml capacity. A c-PAN-0-based web was used as an anode and a Ti foil was used as a cathode in an electrochemical deposition bath. Mixed oxide coatings were deposited onto the surface of the anode filaments. The nano-fiber web coated with a thin mixed vanadium and manganese oxide layer (V/Mn~5/1) was intended for use as a cathode active material in a lithium metal or lithium ion battery. The mixed oxide is substantially amorphous.

Example 15

CVD of Nickel Oxide for the Cathode

Nickel oxide films were deposited on a web of carbonized nano fibers (Sample c-PAN-0) using a chemical vapor deposition process with $Ni(C_5H_5)_2$(bis-cyclopentadienyl nickel) as a precursor and $O_2$ as a partner reactant. $Ni(C_5H_5)_2$, a solid at room temperature, was sublimed at 60° C. (vapor pressure of the precursor at this temperature is 0.15 torr). To prevent premature decomposition, $Ni(C_5H_5)_2$ was sublimed in Ar and then mixed with oxygen just before reaching the reactor. The deposition of nickel film was performed at 100 torr, at a temperature in the range of 200-500° C. The flow rate of the Ar carrier gas through the sublimator was 30 sccm and the O flow rate was 1-200 sccm. The product was typically a mixed phase of NiO and $Ni_2O_3$ and the amount of each phase in the film depended on the deposition condition. Films deposited at a high deposition temperature region (>275° C.) had a higher NiO content.

Example 16

Pulse Laser Deposition (PLD) of Lithium Iron Phosphate Coatings for Cathode

The target of $LiFePO_4$ for PLD was prepared by a solid state reaction using $LiOH.H_2O$ (99.95%, Aldrich), $(CH_3COO)_2Fe$ (99.995%, Aldrich), and $NH_4H_2PO_4$ (99%, Wako Pure Chemical) as raw materials. The target used for PLD was designed to be rich in lithium and phosphorus to the stoichiometric composition to compensate the loss of these elements during deposition. The mixture was first calcined at 450° C. for 12 h under argon gas flow and was ground again. The resulting powders were pressed into a pellet and then sintered at 800° C. for 24 h under argon gas flow. Thin films of $LiFePO_4$ were prepared with a conventional PLD system. The films were deposited on a web of CNF filaments for 30 min at room temperature. The films were then annealed at 127-527° C. for 3 hours under argon gas flow.

Example 17

Solution Deposition of $Li_{1+x}Mn_yFe_zPO_4$ Thin Coatings $Li_{1+x}Mn_yFe_zPO_4$ thin film coatings (where $0<x\leq0.3$, $0.5<y<0.95$, and $0.9<y+z\leq1$) on carbonized nano fibers (Sample c-PAN-5) were successfully prepared by a solution deposition method using lithium acetate, manganese nitrate, and ammonium dihydrogen phosphate as starting materials. Stoichiometric lithium acetate ($Li(CH_3COO).2H_2O$), manganese nitrate ($Mn(NO_3)_2$), and ammonium dihydrogen phosphate ($NH_4H_2PO_4$) were dissolved in 2-methoxyethanol ($CH_3OCH_2CH_2OH$). Then a small amount of concentrated nitric acid was added. Dust and other suspended impurities were removed from the solution by filtering through 0.2 mm syringe filter to form the $Li_{1+x}Mn_yFe_zPO_4$ precursor solution. The substrate (carbonized filament web) was dipped into the solution for 5 minutes each time to form a wet film-coated web. The coated substrate was heated at 380° C. in air for 20 min at a heating rate of 10° C./min to remove the solvents and other organic substances. The dipping and heating procedures were repeated to prepare a coating of a desired thickness. If so desired, the film may be annealed to make the material crystalline. In the process, the addition of concentrated nitric acid was a key step to form the precursor solution for $Li_{1+x}Mn_yFe_zPO_4$. Nitric acid significantly enhanced the solubility of $NH_4H_2PO_4$ in the mixture of solution (it was otherwise very difficult to dissolve $NH_4H_2PO_4$ in 2-methoxyethanol or other alcohol) and prevented the precipitation reaction between the reagents, which made it possible to make homogenous thin films.

The structure, surface morphology, electrochemical behavior, and ionic conductivity of the films were studied by X-ray diffraction, scanning electron microscopy, cyclic voltammetry, and AC impedance. The results showed that $Li_{1+x}Mn_yFe_zPO_4$ thin films prepared by this method were homogenous and crack-free coatings that were basically amorphous. Selected samples were annealed between 750° C. and 900° C. to obtain crystalline structures. Only the amorphous coating samples were evaluated as a cathode active material in the present study.

Example 18

Evaluation of Electrochemical Performance of Various Coated Filament Webs

The electrochemical properties were evaluated under an argon atmosphere by both cyclic voltammetry and galvanostatic cycling in a three-electrode configuration, with the coated filament web-copper substrate as the working electrode and Li foil as both the reference and counter-electrodes. A conductive adhesive was used to bond the filament end portions to the copper foil, which serves as a current collector. Charge capacities were measured periodically and recorded as a function of the number of cycles. The charge capacity herein referred to is the total charge inserted into the coated filament web, per unit mass of the coated filament (counting both coating and substrate filament weights), during Li insertion, whereas the discharge capacity is the total charge removed during Li extraction. The morphological or microstructural changes of selected samples after a desired number of repeated charging and recharging cycles were observed using both transmission electron microscopy (TEM) and scanning electron microscopy (SEM).

Figure 5:
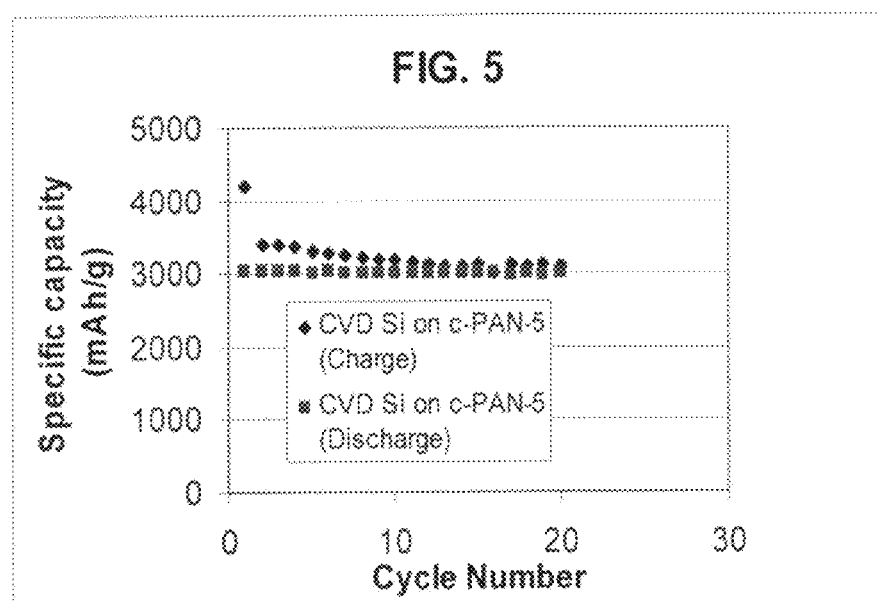
FIG. 5 Specific capacities of CVD Si-coated Sample c-PAN-5 (carbonized, electro-spun, conductive filler-containing PAN fibrils) plotted as a function of the number of charge and discharge cycles (up to 20 cycles).
Figure 6:
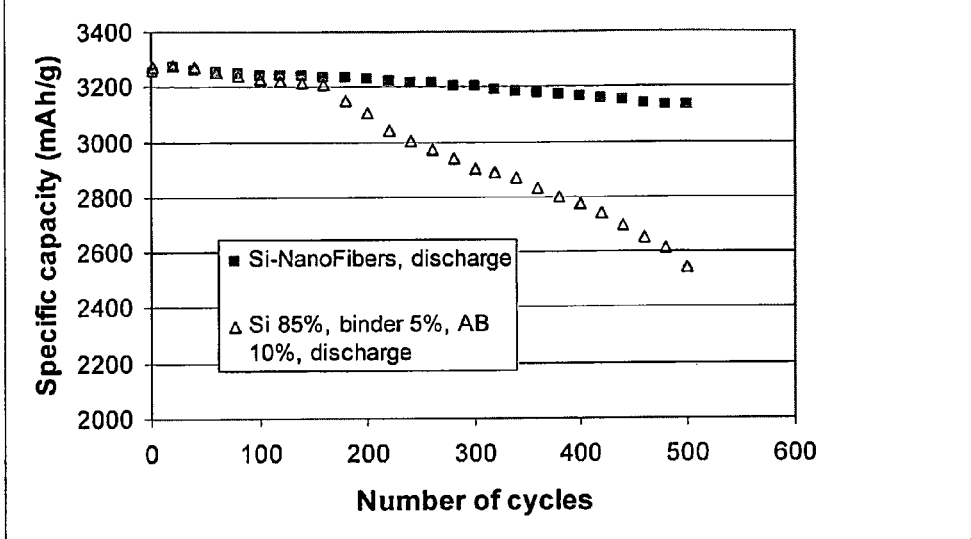
FIG. 6 Specific capacities of CVD Si-coated Sample c-PAN-0 (carbonized, electro-spun PAN nano-fibers) plotted as a function of the number of charge and discharge cycles (up to 500 cycles).

Shown in FIG. 5 and FIG. 6 are the specific capacities of CVD Si-coated Sample c-PAN-5 (carbonized, electro-spun NGP-containing PAN fibrils) and c-PAN-0, respectively, plotted as a function of the number of charge and discharge cycles. The reversible specific capacity remains almost 3,000 mAh/g even after 500 cycles. It may be noted that Chan, et al. [Ref. 14] only showed the data for their Si nanowire-based electrode up to 10 cycles of charge-discharge. It was not clear how their electrode would respond to a larger number of cycles.

It may be further noted that the electrochemical responses of the presently invented hybrid nano material-based anodes are superior to those of amorphous, thin Si films (directly coated on a current collector) in terms of both a high reversible specific capacity and long cycle life, as reported in [Refs. 25-33]. Our anode materials perform the best in terms of reversible specific capacity, with only one exception [Ref. 33], in which Jung, et al. reported a high discharge capacity of approximately 4,000 mAh/g in one particular case. However, the capacity drops precipitously after 15 cycles in this case.

Figure 7:
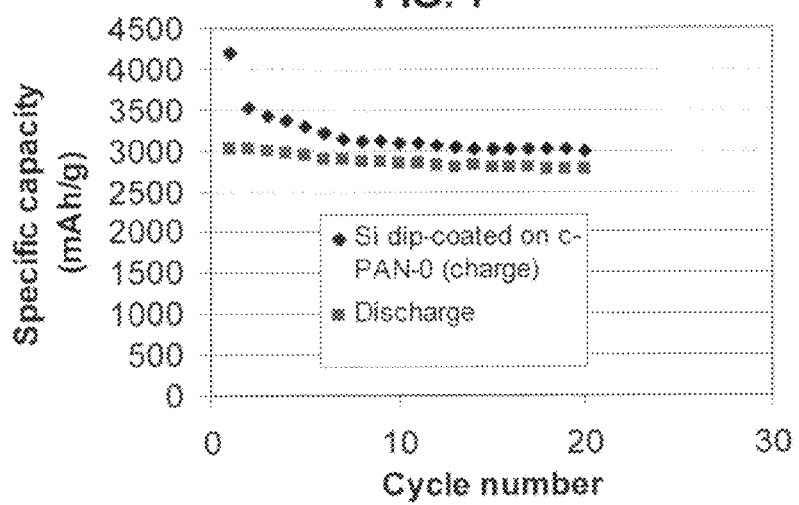
FIG. 7 Specific capacities of Si dip-coated Sample c-PI-0 (carbonized, electro-spun polyimide fibrils) plotted as a function of the number of charge and discharge cycles.

FIG. 7 shows the results of a study on specific capacities of Si dip-coated Sample c-PI-0, which was based on electro-spun PI fibrils that were carbonized at 1,000° C. The specific capacities were plotted as a function of the number of charge and discharge cycles. It is of significance to note that simple dip-coating of carbon nano fibers in molten Si was effective in producing an anode material that exhibits a reversible specific capacity as high as 2,755-3,040 mAh/g (based on per unit gram of the hybrid Si/fiber material). This is as high as 7-8 times the theoretical capacity of a graphite anode material. Dip coating of webs can be a continuous and fast process and is amenable to mass production of high-capacity anode materials. This is a highly surprising result.

Figure 8:
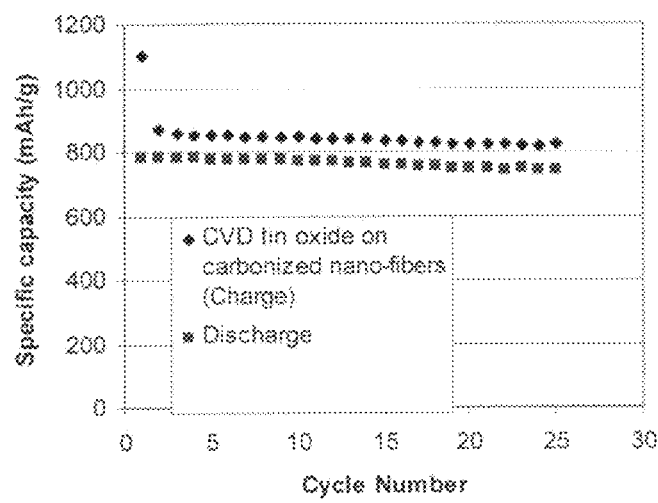
FIG. 8 Specific capacities of CVD tin oxide-coated nano-fibers plotted as a function of the number of charge and discharge cycles.

FIG. 8 shows the specific capacities of CVD tin oxide-coated carbonized nano-fibers plotted as a function of the number of charge and discharge cycles. The results are far better than the values reported for $SiO_2$-based anode systems in [Refs. 34-36].

Figure 9:
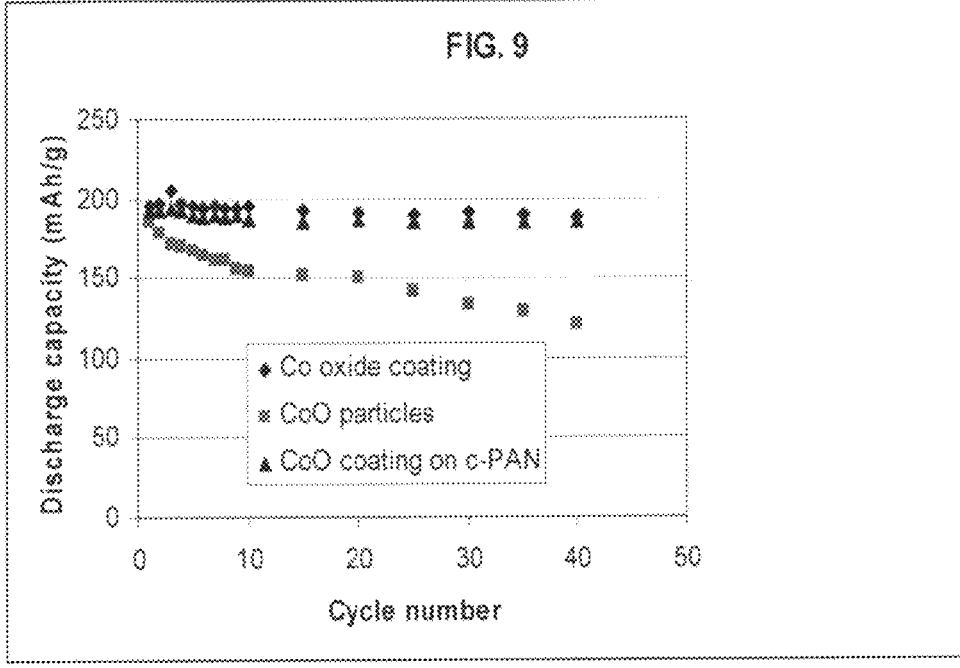
FIG. 9 Specific capacities of cobalt oxide-coated sample (Cathode Sample c-PI-0-CoO), based on electro-spun polyimide nano-fibers carbonized at 1,000° C., and a control sample (based on lithium cobalt oxide particles). Also included are the data on Cathode Sample c-PAN-5-CoO containing an electrochemically deposited oxide coating.

FIG. 9 shows the results of a study on specific capacities of cobalt oxide-coated sample (Cathode Sample c-PI-0-CoO), which was based on electro-spun PI fibrils that were carbonized at 1,000° C., and a control sample (based on lithium cobalt oxide particles, Example 8). Also plotted are the data on Cathode Sample c-PAN-5-CoO containing an electrochemically deposited oxide coating. In each curve, the specific capacity was plotted as a function of the number of discharge cycles. It is of significance to note that the CVD CoO coating on carbonized nano fibers was an effective cathode active material that exhibits a reversible specific capacity as high as 185-205 mAh/g (based on per unit gram of the hybrid filament material). Very little capacity fading was observed for the cathode material based on conductive filament-supported coatings. In contrast, fine particle-based cathode active material shows a continuous decay in capacity after the first cycle.

Figure 10:
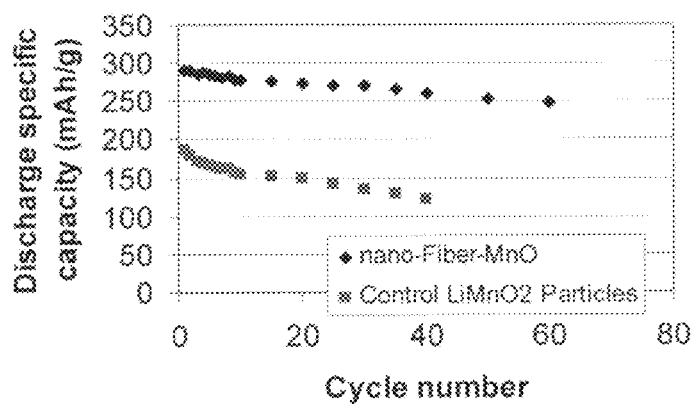
FIG. 10 Specific discharge capacities of a MnO dip-coated web and a control sample.

FIG. 10 shows discharge specific capacities of a MnO dip-coated web (Cathode Sample PAN-0-MnO) also plotted as a function of the number of discharge cycles. The cycling test was conducted between 1.5 V and 3.5 V (with a Li foil as a counter electrode) at a current density of 0.02 mA/cm$^2$. The specific capacity of a control sample comprising MnO particles bonded by 10% PVDF and 10% carbon black was also plotted for comparison. It is clear that the hybrid nano filament-based electrode exhibits a superior cycling behavior. Possibly due to the amorphous nature, the specific capacity exceeds 250 mAh/g for the hybrid nano filament cathode material, which is much higher than the commonly reported value of <200 mAh/g for crystalline $LiMnO_2$ structures. Furthermore, dip coating of webs can be a continuous and fast process and is amenable to mass production of high-capacity cathode materials. This is a highly surprising and desirable result.

Figure 11:
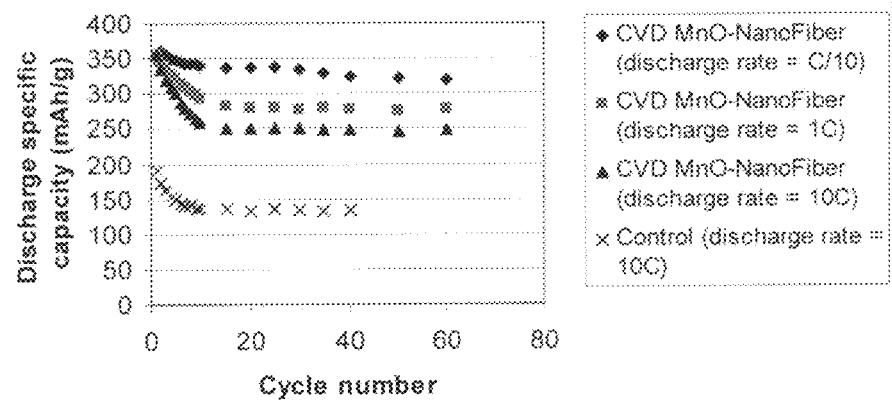
FIG. 11 Discharge specific capacities of CVD manganese oxide-coated CNF web samples conducted at discharge rate of C/10, C, and 10C, respectively. The discharge specific capacity of a control sample (10C) is also included for comparison.

Shown in FIG. 11 are the discharge specific capacities of CVD manganese oxide-coated CNF web samples conducted at discharge rates of C/10, C, and 10C, respectively. Charging was conducted for a maximum capacity of approximately 450 mAh/g. The discharge specific capacity of a control sample under a high discharge rate condition (10C) is also included for comparison. It is clear that the presently invented electrode material performs exceptionally well even under a high discharge rate condition.

This impressive outcome may be explained as follows: The power density of a lithium ion battery is dictated, at the fundamental science level, by the electrochemical kinetics of charge transfer at the electrode/electrolyte interface and the kinetics of solid-state diffusion of lithium ions into and out of the host electrode active material. Thus, the rate capacity of a battery electrode is highly dependent on the electrode active material particle size, thin-film thickness (in the case of a thin film coated on a surface of a current collector), or coating thickness. Since the coating thickness in the present invention is of nanometer scale, the diffusion path is short and the diffusion of Li ions is fast, enabling a good high-rate discharge response.

FIG. 12 shows the specific capacities of electrochemically deposited vanadium oxide coating-CNF and mixed vanadium-manganese oxide coating-CNF samples. The charging cycle was conducted to reach a maximum capacity of 450 mAh/g. The specific capacities of both samples were unusually high compared with commonly observed values of <200 mAh/g associated with crystalline $V_2O_5$ structures. This was likely due to the notion that both types of coatings as herein prepared were amorphous. The $V_2O_5$ coating electrode loses a significant fraction of its reversible capacity initially, but reaches an essentially constant capacity state after 50 cycles. This initial drop might be caused by the graduate crystallization of vanadium oxide from the amorphous state. The presence of some Mn oxide appears to assist in inhibiting the crystallization of vanadium oxide structure and, hence, the mixed oxide sample maintains a high reversible specific capacity even after 100 cycles.

The discharge specific capacities of CNF webs coated with $Li_{1+x}Mn_yFe_zPO_4$ and $LiFePO_4$, respectively, are shown in FIG. 13. The specific capacities of a control sample, based on fine particles bonded by 10% binder and 10% carbon black, are also included in the diagram for the purpose of comparison. Clearly, the hybrid nano filament electrode materials are better than the state-of-the-art particle-based $LiFePO_4$ cathode in light of both a high reversible specific capacity and a long cycle life.

In summary, the present invention provides an innovative, versatile platform materials technology that enables the design and manufacture of superior cathode and anode materials for lithium metal or lithium ion batteries. In one preferred embodiment, the invented method of producing a hybrid nano-filament composition comprises: (a) operating an electro-spinning apparatus to obtain electro-spun polymer fibers that physically contact or chemically bond to one another to form an aggregate or web of polymer fibers; (b) pyrolyzing the polymer fibers to obtain carbonized electro-spun fibers that form a porous network of electrically conductive filaments; and (c) depositing micron- or nanometer-scaled coating onto a surface of the electro-spun nano-fibers, wherein the coating comprises an electro-active material capable of absorbing and desorbing lithium ions and the coating has a thickness less than 10 μm. The electro-spun fibers have a diameter preferably smaller than 1 μm, but preferably less than 500 nm, and most preferably less than 100 nm. The coating thickness is preferably less than 1 μm and more preferably less than 500 nm. The electro-spun fiber diameter and the coating thickness are preferably chosen in such manner that the total coating volume is at least 80% of the sum of the total coating volume and the total electro-spun fiber volume.

This new technology has the following main advantages:

(1) The approach of using highly conductive, nano-scaled filaments (nanometer-scale diameter) to support a cathode or an anode active material coating proves to be a superior strategy, which is applicable to a wide range of coating materials that have a high Li-absorbing capacity. The geometry of the underlying filament enables the supported coating to freely undergo strain relaxation in transverse directions when the coating layer is swollen with incoming lithium. The coating does not lose its contact with the underlying substrate filament upon repeated charge/discharge cycling. This has proven to be a robust configuration.

(2) With the active material coating thickness less than 1 μm (thinner than 100 nm in many cases), the distance that lithium ions have to travel is short. The cathode and/or anode can quickly store or release lithium and thus can be recharged at a fast rate and discharged at a high rate (e.g., during automobile acceleration). This is a highly beneficial feature for a battery that is intended for high power density applications such as electric cars.

(3) The interconnected network of filaments forms a continuous path for electron transport, resulting in significantly reduced internal energy loss or internal heating. This network is electronically connected to a current collector and, hence, all filaments are essentially connected to the current collector.

(4) In the instant invention, the coating is wrapped around a filament and, even if the coating were to fracture into separate segments, individual segments would still remain in physical contact with the underlying filament, which is essentially part of the current collector. In the case of a hybrid nano-filament cathode, the electrons transported to the cathode can still be distributed to all cathode active coatings. In the case of a hybrid nano-filament anode, the electrons generated at the anode can still be collected. Surprisingly, the chemical, thermal, and mechanical compatibility between the electro-active material and the electro-spun nano-fiber was found to be exceptional. For those samples that have been subjected to a large number of repeated charging and discharging cycles (e.g., 500 cycles), no significant de-wetting or detaching was observed.

(5) Electro-spinning is a fast and inexpensive process that can be easily scaled-up for mass production. In contrast, both carbon nano-tubes and vapor-grown carbon nano-fibers, although electrically conductive, are extremely expensive.

(6) The electrode material in the present invention provides an exceptionally high reversible specific capacity. Even when the weight of the filaments is accounted for, the maximum capacity can still be exceptionally high since the underlying filament normally occupies only a very small weight fraction of the total hybrid nano material. Furthermore, the Li ion batteries featuring the presently invented coated filament-based nano hybrid electrode material exhibit superior multiple-cycle behaviors with only a small capacity fade and a long cycle life.

(7) A combination of electro-spinning, carbonization, and surface coating surprisingly provides a synergistic effect in terms of producing lithium battery electrodes with an exceptionally high specific capacity and an outstanding cycle life.

The invention claimed is:

1. A method of producing a hybrid nano-filament electrode for a lithium battery, said method comprising:
   a) Providing an aggregate of nanometer-scaled, electrically conductive filaments that are substantially interconnected, intersected, physically contacted, or chemically bonded to form a porous network of electrically conductive filaments, wherein said filaments comprise electro-spun nano-fibers that have a diameter less than 500 nm;
   b) Depositing micron- or nanometer-scaled coating onto a surface of said electro-spun nano-fibers, wherein said coating comprises a cathode active material capable of absorbing and desorbing lithium ions and said coating has a thickness less than 10 μm; and
   c) Preparing a lithium battery cathode using the electro-spun nano-fibers having the coating on the surface thereof.

2. The method of claim 1 wherein said electro-spun nano-fibers have a diameter smaller than 100 nm or said coating has a thickness smaller than 1 μm.

3. The method of claim 1 wherein said coating has a thickness smaller than 200 nm.

4. The method of claim 1 wherein said step of providing an aggregate of nanometer-scaled, electrically conductive filaments comprises a procedure of: (a) electro-spinning of nano-fibers from a conductive polymer; (b) electro-spinning of nano-fibers from a polymer containing a conductive nano filler; or (c) electro-spinning of nano-fibers from a polymer and applying an electrically conductive coating material onto a surface of said nano-fibers.

5. The method of claim 4 wherein procedure (c) of electro-spinning of nano-fibers comprises applying an electrically conductive coating material selected from a conductive polymer, a conductive organic material, a metal or metal alloy, amorphous carbon, polymeric carbon, or a combination thereof.

6. The method of claim 1 wherein said step of providing an aggregate of nanometer-scaled, electrically conductive filaments comprise: (a) electro-spinning of nano-fibers from a polymer solution in a container chamber with an orifice, wherein said container or orifice serves as an electrode and said polymer solution is propelled from said orifice toward a counter electrode disposed at a working distance; and (b) providing a moving substrate that moves from a feeder roller to a collector roller, wherein said substrate is disposed at a working distance proximal to said counter electrode in such a manner that said nano-fibers are deposited onto said substrate continuously or intermittently and form a network of conductive filaments thereon.

7. The method of claim 6 further comprising a step of collecting said nano-fibers as a roll of conductive filament mat on said collector roller.

8. The method of claim 4 wherein said step of electro-spinning of nano-fibers is conducted on a continuous or intermittent basis.

9. The method of claim 4 wherein said step of electro-spinning of nano-fibers is conducted on a roll-to-roll basis.

10. The method of claim 4 wherein said step of depositing micron- or nanometer-scaled coating onto a surface of said electro-spun nano-fibers comprises metal melt dip-coating, solution dip-coating, chemical vapor deposition, physical vapor deposition, plasma-enhanced chemical vapor deposition, plasma-enhanced physical vapor deposition, plasma arc deposition, hot-wire chemical vapor deposition, sputtering, reactive sputtering, laser-assisted deposition, ion beam-assisted deposition, electrochemical deposition, sol-gel coating, electrophoretic deposition, or a combination thereof.

11. A method of producing a hybrid nano-filament electrode for a lithium battery, said method comprising:
   a) Providing an aggregate of nanometer-scaled, electrically conductive filaments that are substantially interconnected, intersected, physically contacted, or chemically bonded to form a porous network of electrically conductive filaments, wherein said filaments comprise electro-spun nano-fibers that have a diameter less than 500 nm;
   b) Depositing micron- or nanometer-scaled coating onto a surface of said electro-spun nano-fibers, wherein said coating comprises an electro-active material capable of absorbing and desorbing lithium ions and said coating has a thickness less than 10 μm; and
   c) Preparing a lithium battery electrode using the electro-spun nano-fibers having the coating on the surface thereof;
wherein the electro-active material comprises a non-Si anode active material, selected from the group consisting of: (a) germanium (Ge), tin (Sn), lead (Pb), antimony (Sb), bismuth (Bi), zinc (Zn), and cadmium (Cd); (b) alloys or intermetallic compounds of Ge, Sn, Pb, Sb, Bi, Zn, Al, or Cd with other elements, wherein said alloys or compounds are stoichiometric or non-stoichiometric; (c) oxides, carbides, nitrides, sulfides, phosphides, selenides, and tellurides of Ge, Sn, Pb, Sb, Bi, Zn, or Cd, and their mixtures or composites; and (d) combinations thereof.

12. The method of claim 11 wherein said step of depositing micron- or nanometer-scaled coating onto a surface of said electro-spun nano-fibers comprises coating its precursor onto a surface of said nano-fibers and chemically or thermally converting said precursor into an electro-active material.

13. The method of claim 12 wherein said electro-spun nano-fibers comprise a polymer therein or thereon and said polymer and said precursor are pyrolyzed or heat-treated substantially at the same time.

14. The method of claim 1 wherein the electro-active material comprises a cathode active material selected from the group consisting of lithium cobalt oxide, doped lithium cobalt oxide, lithium nickel oxide, doped lithium nickel oxide, lithium manganese oxide, doped lithium manganese oxide, lithium iron phosphate, lithium manganese phosphate, lithium vanadium oxide, doped lithium vanadium oxide, lithium vanadium phosphate, lithium transition metal phosphate, lithium mixed-metal phosphates, metal sulfides, and combinations thereof.

15. The method of claim 1, wherein said electro-spun nano-fibers comprise a polymer therein or thereon which is selected from poly (acrylonitrile), polyfurfuryl alcohol, poly(amic acid), polyimide, phenolic resin, or a combination thereof.

16. The method of claim 4, wherein said conductive polymer comprises an intrinsically conductive polymer or conjugate-chain polymer.

17. A method of producing a hybrid nano-filament electrode for a lithium battery, said method comprising:
   a) Operating an electro-spinning apparatus to obtain electro-spun polymer fibers that physically contact or chemically bond to one another to form an aggregate or web of polymer fibers;
   b) Pyrolyzing said polymer fibers to obtain carbonized electro-spun fibers that form a porous network of electrically conductive filaments;
   c) Depositing micron- or nanometer scaled coating onto a surface of said electro-spun nano-fibers, wherein said coating comprises a cathode active material capable of absorbing and desorbing lithium ions and said coating has a thickness less than 10 μm; and
   d) Preparing a lithium battery cathode using the electro-spun nano-fibers having the coating on the surface thereof.

18. The method of claim 17 wherein the step of pyrolyzing is followed by a step of graphitizing said carbonized electro-spun fibers prior to the step of depositing.

19. The method of claim 17 wherein the step of pyrolyzing and the step of depositing are conducted substantially at the same time.

20. The method of claim 11 wherein said step of depositing micron- or nanometer-scaled coating onto a surface of said electro-spun nano-fibers comprises dipping said nano-fibers in tin melt.

* * * * *